(12) United States Patent
Lee et al.

(10) Patent No.: US 12,150,142 B2
(45) Date of Patent: Nov. 19, 2024

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Youngdae Lee, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 486 days.

(21) Appl. No.: 17/578,054

(22) Filed: Jan. 18, 2022

(65) Prior Publication Data

US 2022/0232609 A1     Jul. 21, 2022

(30) Foreign Application Priority Data

Jan. 18, 2021    (KR) ........................ 10-2021-0006589

(51) Int. Cl.
| | |
|---|---|
| *H04W 72/23* | (2023.01) |
| *H04L 1/1812* | (2023.01) |
| *H04W 72/0446* | (2023.01) |
| *H04W 72/1263* | (2023.01) |
| *H04W 72/21* | (2023.01) |
| *H04W 72/542* | (2023.01) |
| *H04W 72/566* | (2023.01) |

(52) U.S. Cl.
CPC ........... *H04W 72/23* (2023.01); *H04L 1/1812* (2013.01); *H04W 72/0446* (2013.01); *H04W 72/1263* (2013.01); *H04W 72/21* (2023.01); *H04W 72/542* (2023.01); *H04W 72/569* (2023.01)

(58) Field of Classification Search
CPC ............ H04L 1/1812; H04W 72/0446; H04W 72/1263; H04W 72/23; H04W 72/21; H04W 72/542; H04W 72/569
See application file for complete search history.

(56) References Cited

U.S. PATENT DOCUMENTS

2024/0057108 A1*    2/2024   Yi ........................ H04L 1/1854

* cited by examiner

*Primary Examiner* — Sulaiman Nooristany
(74) *Attorney, Agent, or Firm* — Fish & Richardson P.C.

(57) ABSTRACT

According to an embodiment of the present the UE may receive a plurality of physical downlink control channels (PDCCHs) including a first PDCCH carrying first DCI for unicast scheduling and a second PDCCH carrying second DCI for multicast scheduling; receive one or more downlink signals including a unicast physical downlink shared channel (PDSCH) scheduled by the first DCI, and a multicast PDSCH scheduled by the second DCI; and transmit a single physical uplink control channel (PUCCH), based on uplink control information (UCI) including hybrid automatic repeat request (HARQ) feedback information for the one or more DL signals including at least one of first HARQ feedback information for the unicast PDSCH, and second HARQ feedback information for the multicast PDSCH.

15 Claims, 12 Drawing Sheets

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application claims the benefit of Korean Application No. 10-2021-0006589, filed on Jan. 18, 2021, which is hereby incorporated by reference as if fully set forth herein.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

In an aspect of the present invention, a method of receiving a signal by a user equipment (UE) in a wireless communication system, may include receiving a plurality of physical downlink control channels (PDCCHs) each carrying downlink control information (DCI), receiving one or more downlink (DL) signals based on the PDCCHs, transmitting a single physical uplink control channel (PUCCH), based on uplink control information (UCI) including hybrid automatic repeat request (HARQ) feedback information for the one or more DL signals. According to other aspect of the present invention, a method of transmitting a signal by a base station (BS) in a wireless communication system, may include transmitting a plurality of physical downlink control channels (PDCCHs) each carrying downlink control information (DCI), transmitting one or more downlink (DL) signals based on the PDCCHs, receiving a single physical uplink control channel (PUCCH), based on uplink control information (UCI) including hybrid automatic repeat request (HARQ) feedback information for the one or more DL signals.

For example, the one or more DL signals may include a unicast physical downlink shared channel (PDSCH) scheduled by the first DCI, and a multicast PDSCH scheduled by the second DCI; and wherein the plurality of PDCCHs may include a first PDCCH carrying first DCI for unicast scheduling and a second PDCCH carrying second DCI for multicast scheduling; wherein the HARQ feedback information may include at least one of first HARQ feedback information for the unicast PDSCH, and second HARQ feedback information for the multicast PDSCH. Preferably, in a state where the UCI for the single PUCCH includes two or more of the HARQ feedback information, a scheduling request (SR), and a channel state information (CSI) report, and a size of the UCI exceeds a maximum payload size of the single PUCCH, the UE may perform UCI multiplexing for the signal PUCCH based on a priority of the HARQ feedback information, a priority of the SR and a priority of the CSI report. The priority of the HARQ feedback information may be higher than the priority of the SR, and within the HARQ feedback information, the first HARQ feedback information may be prioritized over the second HARQ feedback information.

Preferably, the SR is related to a unicast SR, and the second HARQ feedback information for the multicast PDSCH is prioritized over the unicast SR.

Preferably, the CSI report is allocated with a lowest priority. Preferably, within the CSI report, a first CSI report related to the unicast PDSCH is prioritized over a second CSI report related to the multicast PDSCH.

Preferably, the UE performs dropping from a lowest priority such that the multiplexed UCI does not exceed the maximum payload size of the single PUCCH.

Preferably, in a state where the UCI for the single PUCCH includes the two or more of the HARQ feedback information, the SR, and the CSI report, but the size of the UCI does not exceed the maximum payload size of the single PUCCH, the UE performs UCI multiplexing without dropping.

Preferably, wherein the first HARQ feedback information for the unicast PDSCH is always configured based on an acknowledgment (ACK)/Negative-ACK (NACK)-based scheme, and the second HARQ feedback information for the multicast PDSCH, is configured based on either the ACK/NACK-based scheme or a NACK only-based scheme.

Preferably, the UE may receive HARQ feedback configuration for the multicast PDSCH including information indicating either the ACK/NACK-based scheme or the NACK only-based scheme.

According to other aspect of the present invention, a non-transitory computer readable medium recorded thereon program codes for performing the aforementioned method is presented.

According to another aspect of the present invention, the UE configured to perform the aforementioned method is presented.

According to another aspect of the present invention, a device configured to control the UE to perform the aforementioned method is presented.

BRIEF DESCRIPTION OF THE DRAWINGS

FIG. 11 to FIG. 14 illustrate a communication system 1 and wireless devices applied to the present disclosure.

DETAILED DESCRIPTION

Figure 1:
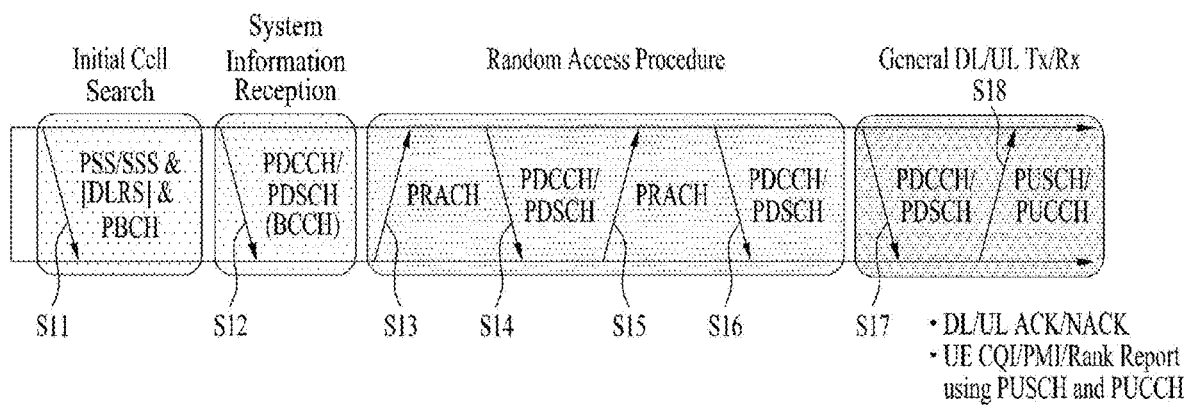
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:

3GPP LTE
  TS 36.211: Physical channels and modulation
  TS 36.212: Multiplexing and channel coding
  TS 36.213: Physical layer procedures
  TS 36.300: Overall description
  TS 36.321: Medium Access Control (MAC)
  TS 36.331: Radio Resource Control (RRC)

3GPP NR
  TS 38.211: Physical channels and modulation
  TS 38.212: Multiplexing and channel coding
  TS 38.213: Physical layer procedures for control
  TS 38.214: Physical layer procedures for data
  TS 38.300: NR and NG-RAN Overall Description
  TS 38.321: Medium Access Control (MAC)
  TS 38.331: Radio Resource Control (RRC) protocol specification Abbreviations and Terms PDCCH: Physical Downlink Control CHannel
  PDSCH: Physical Downlink Shared CHannel
  PUSCH: Physical Uplink Shared CHannel
  CSI: Channel state information
  RRM: Radio resource management
  RLM: Radio link monitoring
  DCI: Downlink Control Information
  CAP: Channel Access Procedure
  Ucell: Unlicensed cell
  PCell: Primary Cell
  PSCell: Primary SCG Cell
  TBS: Transport Block Size
  SLIV: Starting and Length Indicator Value
  BWP: BandWidth Part
  CORESET: COntrol REsourse SET
  REG: Resource element group
  SFI: Slot Format Indicator
  COT: Channel occupancy time
  SPS: Semi-persistent scheduling
  PLMN ID: Public Land Mobile Network identifier
  RACH: Random Access Channel
  RAR: Random Access Response
  Msg3: Message transmitted on UL-SCH containing a C-RNTI MAC CE or CCCH SDU, submitted from upper layer and associated with the UE Contention Resolution Identity, as part of a Random Access procedure.
  Special Cell: For Dual Connectivity operation the term Special Cell refers to the PCell of the MCG or the PSCell of the SCG depending on if the MAC entity is associated with the MCG or the SCG, respectively. Otherwise the term Special Cell refers to the PCell. A Special Cell supports PUCCH transmission and contention-based Random Access, and is always activated.
  Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
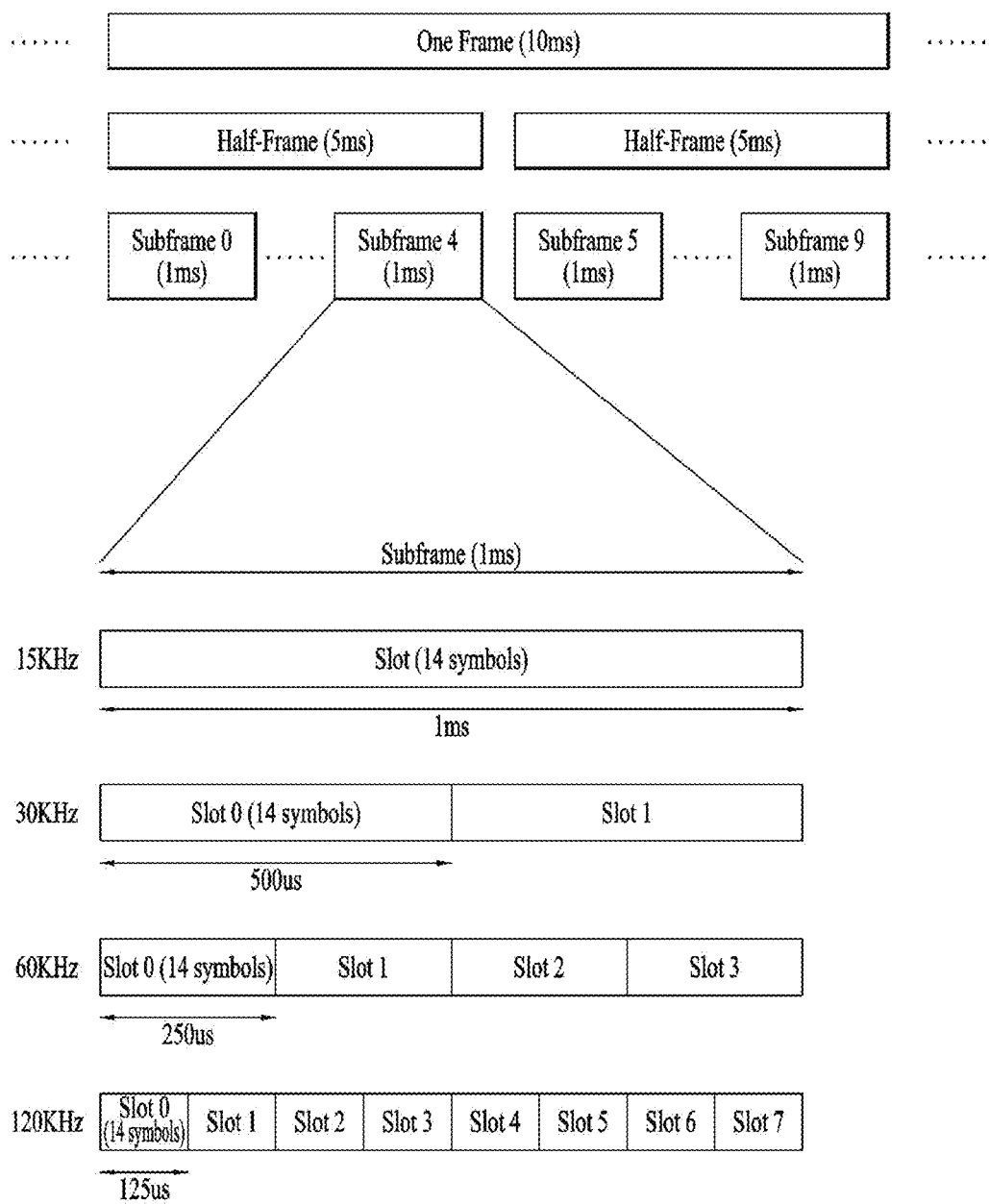
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2$^u$) | N$^{slot}_{symb}$ | N$^{frame, u}_{slot}$ | N$^{subframe, u}_{slot}$ |
|---|---|---|---|
| 15 KHz (u = 0) | 14 | 10 | 1 |
| 30 KHz (u = 1) | 14 | 20 | 2 |

TABLE 1-continued

| SCS (15*2$^u$) | N$^{slot}_{symb}$ | N$^{frame, u}_{slot}$ | N$^{subframe, u}_{slot}$ |
|---|---|---|---|
| 60 KHz (u = 2) | 14 | 40 | 4 |
| 120 KHz (u = 3) | 14 | 80 | 8 |
| 240 KHz (u = 4) | 14 | 160 | 16 |

*N$^{slot}_{symb}$: Number of symbols in a slot
*N$^{frame, u}_{slot}$: Number of slots in a frame
*N$^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2$^U$) | N$^{slot}_{symb}$ | N$^{frame, u}_{slot}$ | N$^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
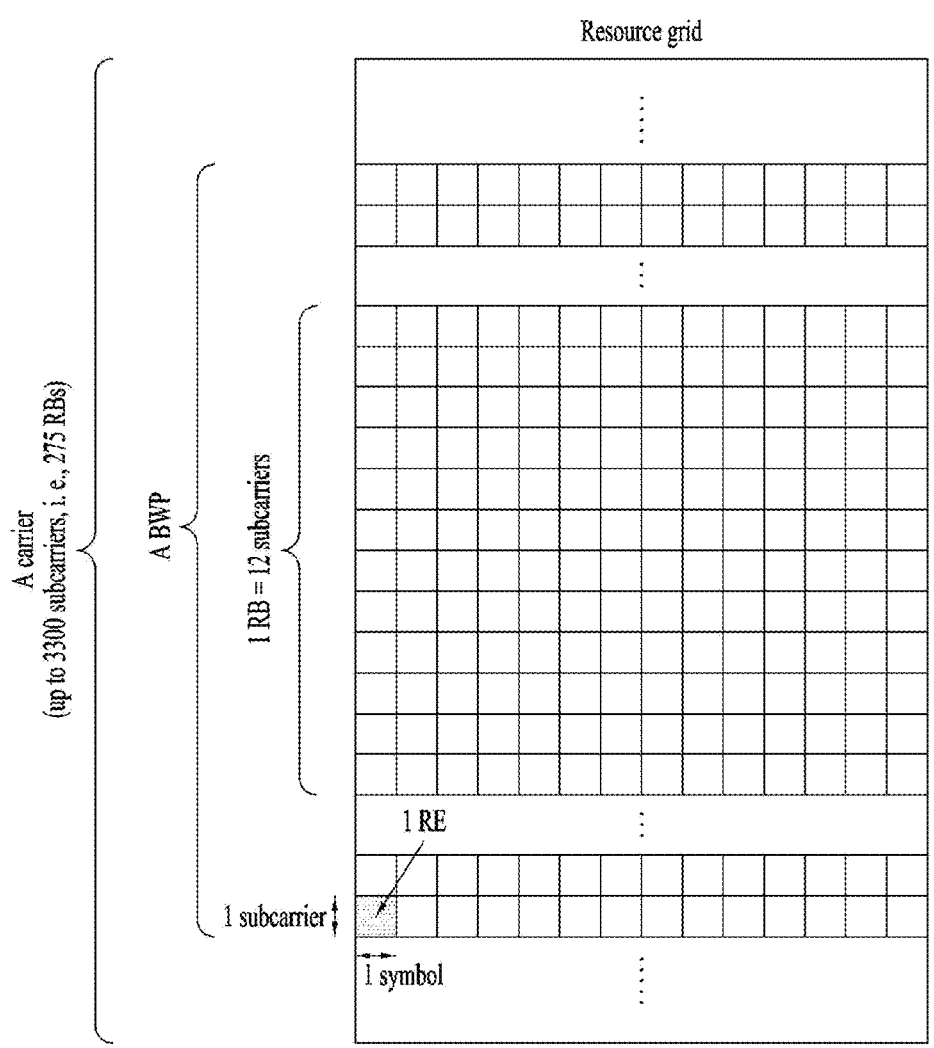
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
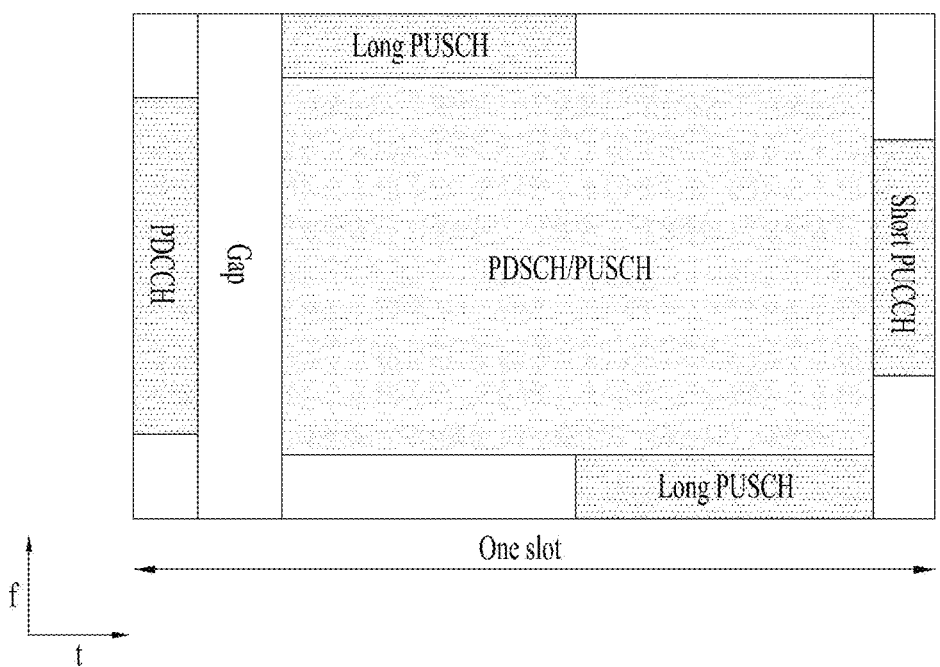
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
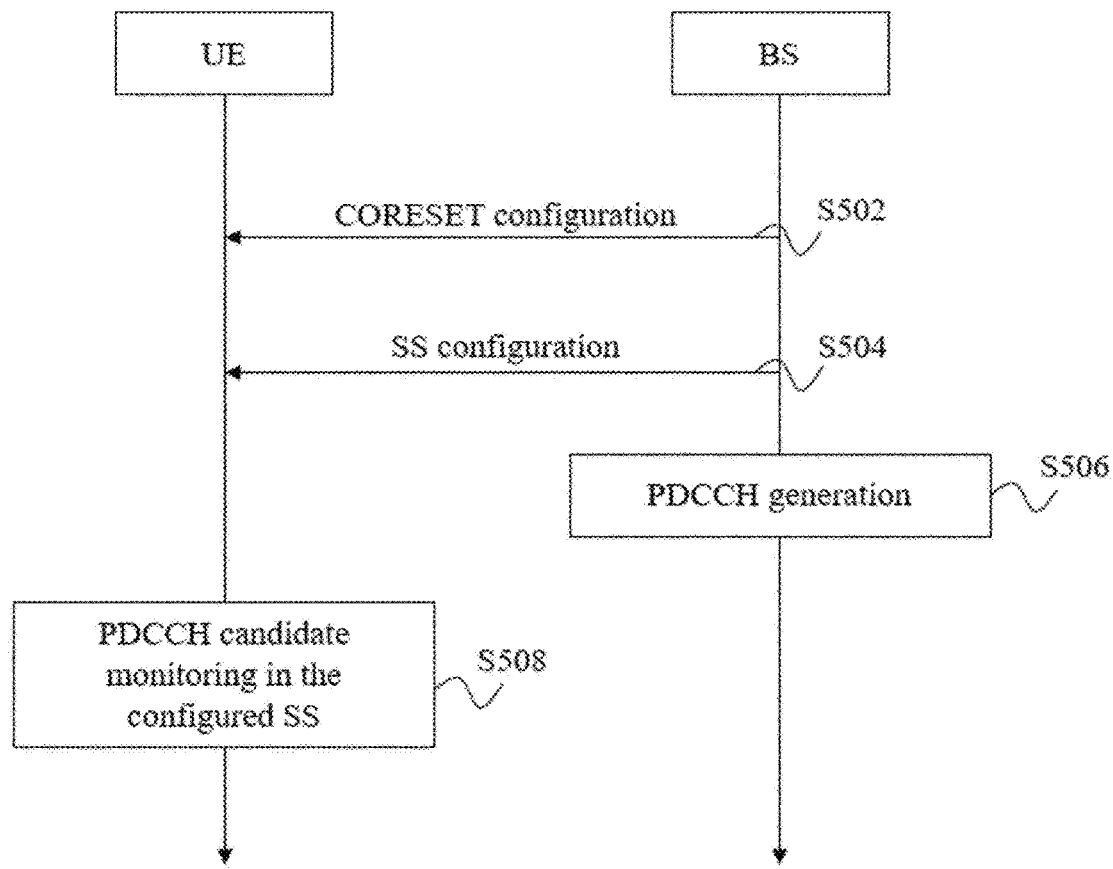
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORSET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORSET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

PDSCH carries downlink data (e.g., DL-SCH transport block, DL-SCH TB). The modulation scheme such as Quadrature Phase Shift Keying (QPSK), 16 Quadrature Amplitude Modulation (QAM), 64 QAM, or 256 QAM is applied to the PDSCH. A codeword is generated by encoding the TB. The PDSCH can carry up to two codewords. Scrambling and modulation mapping are performed for each codeword, and modulation symbols generated from each codeword may be mapped to one or more layers. Each layer is mapped to resources along with a demodulation reference signal (DMRS), is generated as an OFDM symbol signal, and is transmitted through a corresponding antenna port.

PUCCH carries Uplink Control Information (UCI). UCI may include one or more of following information:

SR (Scheduling Request): Information used to request a UL-SCH resource.

HARQ (Hybrid Automatic Repeat reQuest)-ACK (Acknowledgment): It is a response to a downlink data packet (e.g., codeword) on the PDSCH, and indicates whether the downlink data packet has been successfully received. 1 bit of HARQ-ACK may be transmitted in response to a single codeword, and 2 bits of HARQ-ACK may be transmitted in response to two codewords. The HARQ-ACK response includes positive ACK (simply, ACK), negative ACK (NACK), DTX or NACK/DTX. Here, HARQ-ACK may be called as HARQ ACK/NACK and ACK/NACK.

CSI (Channel State Information): feedback information for a downlink channel. Multiple Input Multiple Output (MIMO)-related feedback information includes a Rank Indicator (RI) and a Precoding Matrix Indicator (PMI).

Table 5 shows PUCCH formats. According to PUCCH length, PUCCH formats can be classified as Short PUCCH (format 0, 2) and Long PUCCH (format 1, 3, 4).

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |

TABLE 5-continued

| PUCCH format | Length in OFDM symbols $N_{symb}^{PUCCH}$ | Number of bits | Usage | Etc |
|---|---|---|---|---|
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a maximum size of 2 bits, and is mapped and transmitted based on a sequence. Specifically, the UE transmits a specific UCI to the base station by transmitting one of the plurality of sequences through the PUCCH having the PUCCH format 0. The UE transmits a PUCCH format 0 within a PUCCH resource for configuring a corresponding SR only when transmitting a positive SR.

PUCCH format 1 carries UCI with a maximum size of 2 bits, and a modulation symbol is spread by an orthogonal cover code (OCC) (configured differently depending on whether frequency hopping is performed) in the time domain. DMRS is transmitted in a symbol in which a modulation symbol is not transmitted (i.e., time division multiplexing (TDM) is performed).

PUCCH format 2 carries UCI having a bit size greater than 2 bits, and a modulation symbol is transmitted with DMRS based on frequency division multiplexing (FDM). DM-RS is located at symbol indexes #1, #4, #7, and #10 in a given resource block with a density of ⅓. A Pseudo Noise (PN) sequence is used for the DM_RS sequence. For 2-symbol PUCCH format 2, frequency hopping may be enabled.

For PUCCH format 3, UE multiplexing is not performed in the same physical resource blocks, and the PUCCH format 3 carries UCI having a bit size greater than 2 bits. PUCCH resource of PUCCH format 3 does not include an orthogonal cover code. The modulation symbol is transmitted with the DMRS based on time division multiplexing (TDM).

For PUCCH format 4, UE multiplexing is supported for up to 4 UEs in the same physical resource blocks, and the PUCCH format 4 carries UCI having a bit size greater than 2 bits. PUCCH resource of PUCCH format 3 includes an orthogonal cover code. The modulation symbol is transmitted with DMRS based on time division multiplexing (TDM).

PUSCH carries uplink data (e.g., UL-SCH transport block, UL-SCH TB) and/or uplink control information (UCI). PUCCH is transmitted based on a CP-OFDM (Cyclic Prefix-Orthogonal Frequency Division Multiplexing) waveform or a Discrete Fourier Transform-spread-Orthogonal Frequency Division Multiplexing (DFT-s-OFDM) waveform. When the PUSCH is transmitted based on the DFT-s-OFDM waveform, the UE performs transform precoding for the PUSCH. For example, if transform precoding is not performed (e.g., transform precoding is disabled), the UE transmits a PUSCH based on the CP-OFDM waveform. If transform precoding is performed (e.g., transform precoding is enabled), the UE transmits the PUSCH based on a CP-OFDM waveform or a DFT-s-OFDM waveform. PUSCH transmission is dynamically scheduled by a UL grant in DCI (e.g., Layer 1 (PDCCH) signaling), and/or semi-statically scheduled based on higher layer (e.g., RRC) signaling (configured grant). PUSCH transmission may be performed on a codebook-based or non-codebook-based basis.

Figure 6:
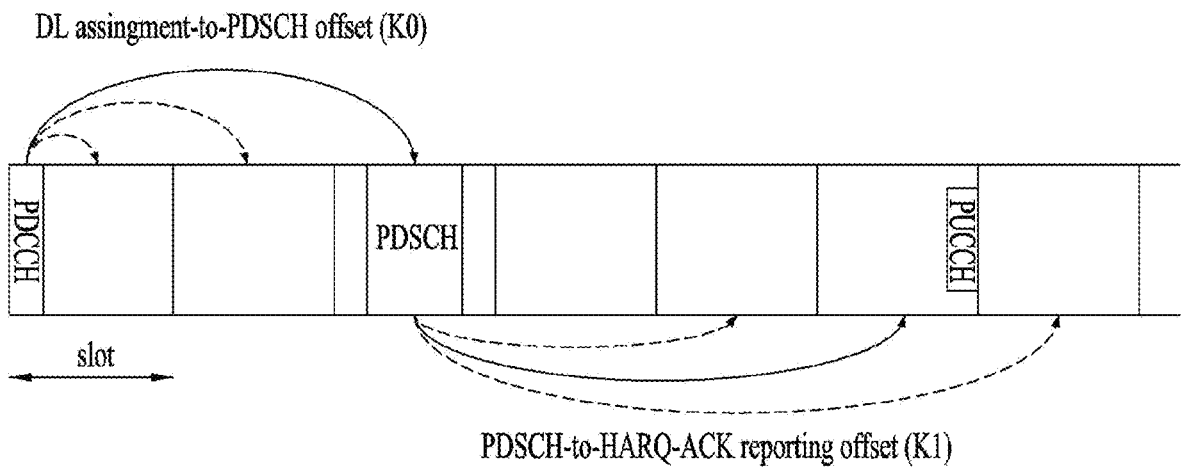
FIG. 6 illustrates an ACK/NACK transmission example.

FIG. 6 illustrates an ACK/NACK transmission example. Referring to FIG. 6, the UE may detect the PDCCH in slot #n. Here, the PDCCH includes downlink scheduling information (e.g., DCI formats 1_0, 1_1), and the PDCCH indicates a DL assignment-to-PDSCH offset (K0) and a PDSCH-HARQ-ACK reporting offset (K1). For example, DCI formats 1_0 and 1_1 may include the following information:

Frequency domain resource assignment (FDRA): FDRA indicates the RB set allocated to the PDSCH.

Time domain resource assignment (TDRA): TDRA indicates K0 (e.g., slot offset), the starting position (e.g., OFDM symbol index) of the PDSCH within slot #n+K0, and the length of the PDSCH (e.g., the number of OFDM symbols).

PDSCH-to-HARQ_feedback timing indicator, which indicates K1 (e.g., slot offset)

HARQ process number (4 bits), which indicates the HARQ process ID (Identity) for data (e.g., PDSCH, TB)

PUCCH resource indicator (PM): PRI indicates a PUCCH resource to be used for UCI transmission among a plurality of PUCCH resources in the PUCCH resource set UE start to receive the PDSCH in slot #(n+K0) based on the scheduling information received in slot #n. After completion of the PDSCH reception in slot #n1 (where, n+K0≤n1), the UE may transmit UCI through PUCCH from slot #(n1+K1). Here, the UCI may include a HARQ-ACK response for the PDSCH. In FIG. 6, for convenience, it is assumed that the SCS for the PDSCH and the SCS for the PUCCH are the same, and it is assumed that slot #n1=slot #n+K0, but the present invention is not limited thereto. If the SCSs are different, K1 may be indicated/interpreted based on the SCS of the PUCCH.

If the PDSCH is configured to carry a maximum of 1 TB, the HARQ-ACK response may have 1-bit. When the PDSCH is configured to carry a maximum of 2 TBs, the HARQ-ACK response may be configured with 2-bits when spatial bundling is not configured, and may be configured with 1-bits when spatial bundling is configured. When the HARQ-ACK transmission time for the plurality of PDSCHs is configured as slot #(n+K1), the UCI transmitted in the slot #(n+K1) includes HARQ-ACK responses for the plurality of PDSCHs.

Whether the UE should perform spatial bundling for the HARQ-ACK response may be configured for each cell group (e.g., RRC/higher layer signaling). As an example, spatial bundling may be individually configured in each of the HARQ-ACK response transmitted through the PUCCH and/or the HARQ-ACK response transmitted through the PUSCH.

Spatial bundling may be supported when the maximum number of TBs (or codewords) that can be received at one time in the corresponding serving cell (or schedulable through 1 DCI) is two (or two or more) (e.g., higher layer parameter maxNrofCodeWordsScheduledByDCI is equal to 2-TB). Meanwhile, a number of layers greater than four may be used for 2-TB transmission, and a maximum of four layers may be used for 1-TB transmission. As a result, when spatial bundling is configured in a corresponding cell group, spatial bundling may be performed on a serving cell that can schedule more than four layers among serving cells in the corresponding cell group. On a corresponding serving cell, a UE desiring to transmit a HARQ-ACK response through spatial bundling may generate a HARQ-ACK response by performing (bit-wise) logical AND operation on A/N bits for a plurality of TBs.

For example, assuming that the UE receives DCI for scheduling 2-TB and receives 2-TB through the PDSCH based on the DCI. If spatial bundling is performed, a single A/N bit may be generated by performing a logical AND operation on the first A/N bit for the first TB and the second A/N bit for the second TB. As a result, if both the first TB and the second TB are ACKs, the UE reports the ACK bit value to the base station, and when either TB is NACK, the UE reports the NACK bit value to the base station.

A plurality of parallel DL HARQ processes can be configured for DL transmission in the base station/terminal. A plurality of parallel HARQ processes allow DL transmissions to be performed continuously while waiting for HARQ feedback on successful or unsuccessful reception of the previous DL transmission. Each HARQ process is associated with a HARQ buffer of a MAC (Medium Access Control) layer. Each DL HARQ process manages information related to the number of MAC PDU (Physical Data Block) transmissions in the buffer, HARQ feedback for the MAC PDU in the buffer, and a current redundancy version. Each HARQ process is identified by a HARQ process ID.

Figure 7:
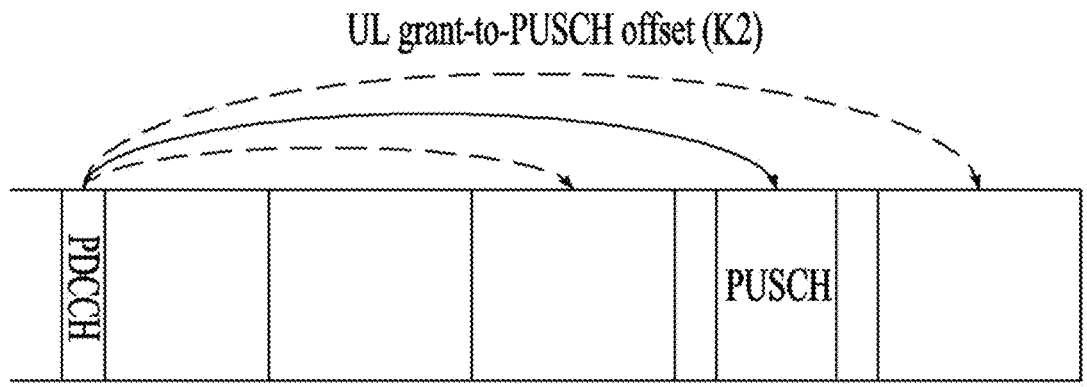
FIG. 7 illustrates a PUSCH transmission example

FIG. 7 illustrates a PUSCH transmission example. Referring to FIG. 7, the UE may detect the PDCCH in slot #n. Here, the PDCCH includes uplink scheduling information (e.g., DCI formats 0_0, 0_1). DCI formats 0_0 and 0_1 may include the following information:

Frequency domain resource assignment (FDRA), which indicates the RB set allocated to the PUSCH CSI-RS or SS Block (SSB)) of the base station, and (2) beam reporting of the UE. Here, the beam reporting may include a preferred DL RS ID(s) and a corresponding reference signal received power (L1-RSRP). The DL RS ID may be an SSB Resource Indicator (SSBRI) or a CSI-RS Resource Indicator (CRI).

The SSB beam and the CSI-RS beam may be used for beam measurement. Here, measurement metric may be L1-RSRP per resource/block. SSB may be used for coarse beam measurement, and CSI-RS may be used for fine beam measurement. And, SSB can be used for both Tx beam sweeping and Rx beam sweeping. Rx beam sweeping using SSB may be performed at a UE by changing the Rx beam for the same SSBRI across multiple SSB bursts. Here, one SS burst includes one or more SSBs, and one SS burst set includes one or more SSB bursts.

The UE may receive RRC configuration regarding a list of maximum M candidate Transmission Configuration Indication (TCI) states for the purpose of at least Quasi Co-location (QCL) indication. Here, M may be 64. Each TCI state may be set to one RS set.

Each ID of DL RS for spatial QCL purpose (e.g., QCL Type D) in the RS set may be related to one of DL RS types such as SSB, P-CSI RS, SP-CSI RS, and A-CSI RS. At least, initialization/update of ID of DL RS(s) in RS set used for spatial QCL purpose can be performed through at least explicit signaling.

Table 6 shows an example of a TCI-State information element (IE). The TCI-State IE associates one or two DL RSs to a corresponding QCL type.

TABLE 6

```
-- ASN1START
-- TAG-TCI-STATE-START
TCI-State ::=              SEQUENCE {
    tci-StateId            TCI-StateId,
    qcl-Type1              QCL-Info,
    qcl-Type2              QCL-Info       OPTIONAL,   -- Need R
    ...
}
QCL-Info ::=               SEQUENCE {
    cell                   ServCellIndex  OPTIONAL,   -- Need R
    bwp-Id                 BWP-Id         OPTIONAL,   -- Cond CSI
-RS-Indicated
    referenceSignal        CHOICE {
        csi-rs                 NZP-CSI-RS-ResourceId,
        ssb                    SSB-Index
    },
    qcl-Type               ENUMERATED {typeA, typeB, typeC, typeD},
    ...
}
-- TAG-TCI-STATE-STOP
-- ASN1STOP
```

Time domain resource assignment (TDRA), which indicates the slot offset K2, the start position (e.g., symbol index) and length (e.g., number of OFDM symbols) of the PUSCH in the slot. The start symbol and length may be indicated through a Start and Length Indicator Value (SLIV), or may be indicated respectively.

UE may transmit the PUSCH in slot #(n+K2) according to the scheduling information received in slot #n. The PUSCH may include a UL-SCH TB.

Beam Management (BM) Procedure

A DL BM procedure is described. DL BM procedure may include (1) transmission of beamformed DL RSs (e.g., In Table 6, the bwp-Id parameter indicates the DL BWP in which the RS is located, the cell parameter indicates the carrier in which the RS is located, and the referencesignal parameter indicates reference antenna port(s) which is a quasi co-location source for target antenna port (s) or a reference signal including the reference antenna port(s). The target antenna port(s) may be an antenna port (s) of a CSI-RS, PDCCH DMRS, or PDSCH DMRS. For example, in order to indicate QCL reference RS information for NZP CSI-RS, a corresponding TCI state ID may be indicated through NZP CSI-RS resource configuration information. The TCI state ID may be indicated through each CORESET configuration, thereby QCL reference information for the PDCCH DMRS antenna port(s) is indicated. The TCI state ID may be indicated through DCI, thereby QCL reference information for the PDSCH DMRS antenna port(s) is indicated.

Antenna port-QCL is defined so that a property of channel carrying a symbol on the antenna port is can be inferred/estimated from a property of a channel carrying another symbol on the same antenna port.

QCL related channel property includes one or more of Delay spread, Doppler spread, Frequency shift, Average received power, Received Timing, and Spatial RX parameter. The Spatial Rx parameter means a spatial (reception) channel characteristic parameter such as angle of arrival.

The UE may be configured with a list of maximum M TCI-States through the higher layer parameter PDSCH-Config for PDSCH decoding according to a detected PDCCH having DCI intended for the UE and a given serving cell. The M depends on UE capability.

Each TCI-State includes parameters for configuring a quasi co-location relationship between one or two DL reference signals and a DM-RS port(s) of a PDSCH. The quasi co-location relationship is configured based on a higher layer parameter 'qcl-Type1' for the first DL RS and a higher layer parameter 'qcl-Type2' (if presented) for the second DL RS. In the case of a corresponding configuration including QCL information for two DL RSs, the QCL type is not the same regardless of whether the two DL RSs are QCLed with the same DL RS or different DL RSs. The quasi co-location type corresponding to each DL RS is given by the higher layer parameter 'qcl-Type of QCL-Info', and can be one of following types:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port(s) relates to a specific NZP CSI-RS, the corresponding NZP CSI-RS antenna ports are indicated/configured to be QCLed with a specific tracking reference signal (TRS) from a QCL-Type A perspective, and with a specific SSB from a QCL-Type D perspective. The UE receiving the indication/configuration can receive the corresponding NZP CSI-RS using the Doppler and delay values measured in QCL-TypeA TRS, and can apply a reception beam used for QCL-TypeD SSB reception to the corresponding NZP CSI-RS reception. The UE receives an activation command which is used for mapping a maximum 8 TCI states to values (field states) of 'Transmission Configuration Indication field' in DCI.

In the UL BM, beam reciprocity (or beam correspondence) between Tx beams and Rx beams may or may not be established according to UE implementation. If the reciprocity between the Tx beam and the Rx beam is established in both the base station and the UE, the UL beam pair may be aligned through the DL beam pair. However, when the reciprocity between the Tx beam and the Rx beam is not established in either of the base station and the UE, a UL beam pair determination process is required separately from the DL beam pair determination. Also, even when both the base station and the UE maintain beam correspondence, the base station may use the UL BM procedure for determining the DL Tx beam without the UE requesting a report of the preferred beam. UL BM may be performed through beamformed UL SRS transmission, and the 'SRS-SetUse' parameter can be set to 'BeamManagement'. Similarly, the UL BM procedure may be divided into Tx beam sweeping of the UE and Rx beam sweeping of the base station. The UE may receive one or more Sounding Reference Symbol (SRS) resource sets configured by (higher layer parameter) SRS-ResourceSet (through higher layer signaling, RRC signaling, etc.). For each SRS resource set, the UE K SRS resources (higher later parameter SRS-resource) may be configured. Here, K is a natural number that is equal to or greater than 1, and the maximum value of K is indicated by SRS_capability. Whether to apply the UL BM of the SRS resource set (higher layer parameter) is configured by SRS-SetUse. When the SRS-SetUse is set to 'BeamManagement (BM)', only one SRS resource can be transmitted to each of a plurality of SRS resource sets at a given time instant.

Cooperative Transmission from Multiple TRPs/Panels/Beams

A coordinated multi-point transmission (CoMP) was introduced in the LTE system and partly introduced in NR Rel-15. The CoMP can be related to (i) a method of transmitting the same signal or the same information from multiple transmission and reception points (TRPs) (e.g., same layer joint transmission), (ii) a method of transmitting by a specific TRP at a specific moment in consideration of radio channel quality or traffic load conditions while sharing information to be transmitted to UE between a plurality of TRPs (e.g., point selection), or (iii) a method of transmitting different signals or information from a plurality of TRPs to different spatial layers by spatial dimension multiplexing (SDM) (e.g., independent layer joint transmission), or other various ways. As one example of the point selection methods, there is a dynamic point selection (DPS) method in which an actual transmitting TRP can be changed at each PDSCH transmission instance, and the QCL information informs the UE of which TRP is transmitting the PDSCH at present. In this regards, the QCL information can be used for indicating the UE can assume the same channel properties (e.g., Doppler shift, Doppler spread, average delay, delay spread, spatial RX parameter) between different antenna ports. For example, when the PDSCH is to be transmitted in TRP #1, it is informed that the corresponding PDSCH DMRS antenna ports and a specific RS (e.g., CSI-RS resource #1) that has been used in TRP #1 are QCLed. And when the PDSCH is to be transmitted in TRP #2, it is informed that the corresponding PDSCH DMRS antenna ports and a specific RS (e.g., CSI-RS resource #2) that has been used in TRP #1 are QCLed. For instantaneous QCL information indication, a PDSCH quasi-colocation information (PQI) field was defined in DCI of LTE, and similarly a transmission configuration information (TCI) field is defined in NR. The QCL indication/configuration method defined in the standard can be used not only for cooperative transmission between a plurality of TRPs, but also used for cooperative transmission between a plurality of panels (e.g., antenna groups) of the same TRP, or for cooperative transmission between a plurality of beams of the same TRP, etc. This is because if transmission panels or beams used in the same TRP are different, the Doppler, delay property, or reception beam (spatial Rx parameter) of each panel/beam may be different.

A method of Multiple TRPs/Panels/Beams are configured to transmit different layer groups to the UE may be used and the method can be called independent layer joint transmission (ILJT) or non-coherent joint transmission (NCJT).

Multimedia Broadcast/Multicast Service (MBMS)

MBMS scheme deployed in 3GPP LTE is described. 3GPP MBMS can classified as (i) a single frequency network (SFN) scheme in which cells of a plurality of base stations are synchronized for transmitting the same date through a PMCH channel, and (ii) a Single Cell Point To Multipoint (SC-PTM) scheme in which broadcasting is performed through PDCCH/PDSCH channel in a corresponding cell coverage. Normally, the SFN scheme is used for providing the broadcast service over wide area (e.g. MBMS area) through pre-allocated semi-static resource(s), whereas the SC-PTM scheme is used for providing the broadcast service within a cell coverage through a dynamic resource(s).

Terms of 3GPP LTE MBMS are defined as follows:

MBSFN Synchronization Area: an area of the network where all eNodeBs can be synchronized and perform MBSFN transmissions. MBSFN Synchronization Areas are capable of supporting one or more MBSFN Areas. On a given frequency layer, a eNodeB can only belong to one MBSFN Synchronization Area. MBSFN Synchronization Areas are independent from the definition of MBMS Service Areas MBSFN Transmission or a transmission in MBSFN mode: a simulcast transmission technique realised by transmission of identical waveforms at the same time from multiple cells. An MBSFN Transmission from multiple cells within the MBSFN Area is seen as a single transmission by a UE.

MBSFN Area: an MBSFN Area consists of a group of cells within an MBSFN Synchronization Area of a network, which are co-ordinated to achieve an MBSFN Transmission. Except for the MBSFN Area Reserved Cells, all cells within an MBSFN Area contribute to the MBSFN Transmission and advertise its availability. The UE may only need to consider a subset of the MB SFN areas that are configured, i.e. when it knows which MB SFN area applies for the service(s) it is interested to receive.

SC-PTM provides one logical channel named as SC-MCCH (Single Cell Multicast Control Channel), and one or more logical channels named as SC-MTCH (Single Cell Multicast Traffic Channel). The logical channels are mapped to a transport channel 'DL-SCH', and a physical channel 'PDSCH'. PDSCH carrying SC-MCCH or SC-MTCH data is scheduled by PDCCH scrambled with G-RNTI. Here, TMGI that corresponds to a service ID can be mapped to a specific G-RNTI value (e.g., one-to-one mapping). Thus, if base station provides a plurality of services a plurality of G-RNTI values can be allocated for SC-PTM transmission. One or more UEs may monitor PDCCH by using a specific G-RNTI for receiving a specific service. For specific service/specific G-RNTI, an SC-PTM dedicated DRX on-duration can be configured. In this case, the UEs may wake-up for a specific on-duration (s) and perform PDCCH monitoring based on G-RNTI.

HARQ-Related Operation for MBS

At least part of above paragraphs (e.g., 3GPP system, frame structure, NR system, etc.) can be referred to/coupled to/combined with one or more embodiments of the invention will be explained below. In the specification, '/' may interpreted as 'and', 'or', or 'and/or' based on its context.

For supporting MBS (Multicast/Broadcast Service) service in NR system, DL broadcast or DL multicast transmission methods are discussed under Rel.-17 NR standard. Comparing with DL unicast transmission to individual UE (i.e., point-to-point), the point-to-multipoint (PTM) transmission scheme such as MBS is advantageous for radio resource saving since multiple UEs can receive one-time DL broadcast/multicast transmission of network.

Meanwhile, in NR, a method in which the UE reports MBS feedback (e.g., HARQ feedback for retransmission) to the base station for reliable DL broadcast/multicast transmission is considered. Since only HARQ feedback for unicast PDCCH/PDSCH transmission is provided in NR REL-15/16, it is not clear how HARQ feedback information for MBS PDCCH/PDSCH should be configured.

Therefore, according to an embodiment of the present invention, a method for configuring MBS HARQ feedback information and an uplink transmission method for UE reporting HARQ feedback for MBS PDSCH transmission and retransmission are presented.

Transmitter (e.g., Base Station)

For broadcasting the MBS service in a cell, the base station may transmit SIB1, MBS SIB, one or more MCCHs, and one or more MTCHs. The MCCH and the MTCH are logical channels and are transmitted through the physical channel (s), PDSCH(s), and are scheduled through the PDCCH (s). The MCCH transmits MBS control information, and one MTCH transmits specific MBS service data.

The base station provides BWP for MBS (i.e., MBS BWP) to UEs. MBS BWP can be divided into MBS SIB DL BWP and MBS SIB UL BWP for MBS SIB transmission and reception, MCCH DL BWP and MCCH UL BWP for MCCH transmission and reception, and MTCH DL BWP and MTCH UL BWP for MTCH transmission and reception. One cell may provide zero, one or more MBS DL BWPs and zero, one or more MBS UL BWPs. Accordingly, the base station supporting MBS may provide all of the above MBS BWP types separately from the existing Initial BWP or UE-dedicated BWP, or may provide only zero or some MBS BWPs. Some or all MBS BWPs may be the same as or different from the conventional Initial BWP or Default BWP or first active BWP or active BWP.

UE may configure SC-RNTI and MCCH transmission according to MBS SIB or MBS control information provided by the base station. MBS SIB or MBS control information may include configuration information for DL BWP and/or UL BWP for MBS.

The MBS SIB or MBS control information may include at least some of the following information.

PUCCH resource sets for MBS feedback: Common PUCCH resource related to specific service ID (e.g., TMGI) or specific G-RNTI or specific MBS DL BWP or specific MTCH(s) or specific MCCH(s). Or, UE-dedicated PUCCH resources used by individual UEs receiving a specific service or specific G-RNTI based transmission.

RACH resource for MBS feedback: RACH resource information related to a specific service ID (e.g., TMGI) or specific G-RNTI or specific MBS DL BWP or specific MTCH(s) or specific MCCH(s). For example, a specific RACH preamble, Preamble Occasion, or RACH occasion may be related to a specific service ID (TMGI), a specific G-RNTI, a specific MBS DL BWP, or a specific MTCH(s) or a specific MCCH(s).

The base station provides MBS through UL BWP and/or DL BWP. For example, MCCH control information and MTCH are provided through DL BWP. Meanwhile, through the UL BWP, MBS feedback for PDSCH for MCCH or MBS feedback for PDSCH for MTCH is provided. The UL BWP may be used for reporting HARQ ACK/NACK of MBS feedback or MBS-related SSB/CSI-RS measurement result.

The base station may configure UE common PUCCH resource sets for a specific UL BWP of a specific cell for MBS feedback. The UE common PUCCH resource set is used by UEs performing HARQ feedback for a specific MBS PDSCH, and the base station may configure the UE common PUCCH resource set as shown in Table 7 below.

TABLE 7

```
PUCCH-ResourceSet ::= SEQUENCE {
    pucch-ResourceSetId      PUCCH-ResourceSetId,
    resourceList SEQUENCE (SIZE (1..maxNrofPUCCH-ResourcesPerSet)) OF PUCCH-
ResourceId,
    maxPayloadSize INTEGER (4..256) OPTIONAL -- Need R
}
PUCCH-Resource ::= SEQUENCE {
    pucch-ResourceId      PUCCH-ResourceId,
    startingPRB PRB-Id,
    intraSlotFrequencyHopping ENUMERATED { enabled } OPTIONAL, -- Need R
    secondHopPRB PRB-Id OPTIONAL, -- Need R
    format CHOICE {
        format0 PUCCH-format0,
        format1 PUCCH-format1,
        format2 PUCCH-format2,
        format3 PUCCH-format3,
        format4 PUCCH-format4}
}
```

Figure 8:
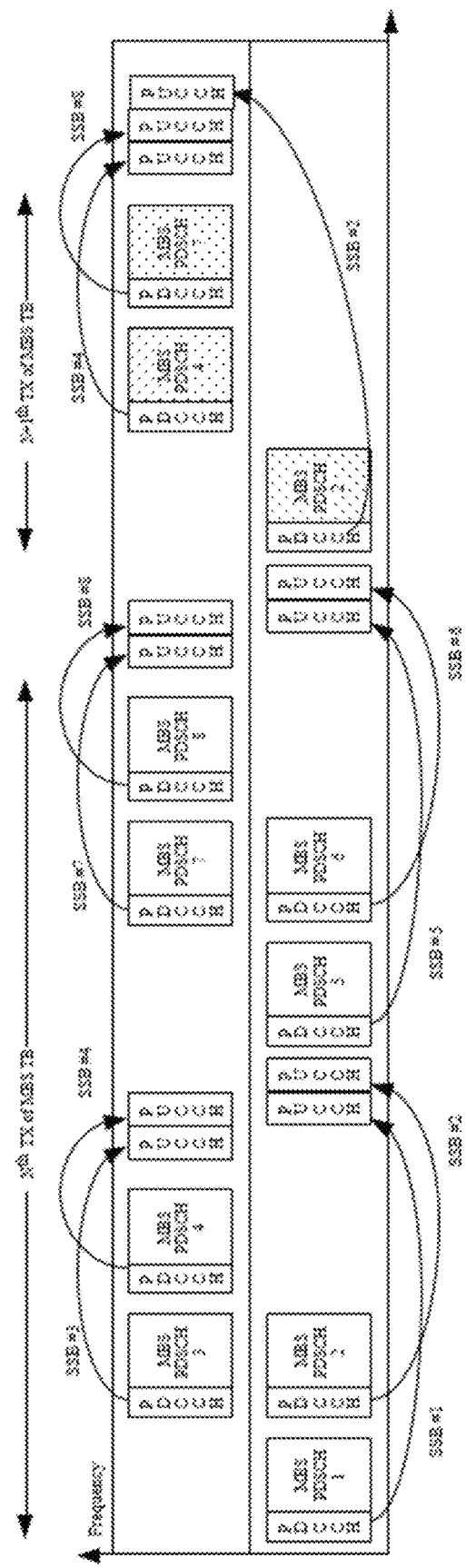
FIGS. 8 and 9 illustrate PDSCH transmission according to an embodiment of the present invention.

One or more MTCH data or one or more MCCH data may be included in one MBS Transport Block (TB) for DL transmission. The base station transmits one MBS TB through PDSCH for MBS. In FIG. 8, one MBS PDSCH transmission is scheduled through DCI of the PDCCH. CRC of DCI may be scrambled with G-RNTI. A plurality of UEs may receive the DCI, decode the PDSCH indicated by the DCI, and receive one MBS TB.

If a plurality of UEs need to receive through different beams, the base station may transmit different MBS PDSCHs on different beam RSs of one cell. In this case, different MBS PDSCHs may be used to repeatedly transmit the same MBS TB. For example, in FIG. 8, all MBS PDSCHs repeatedly transmit the same MBS TB, and different MBS PDSCH transmissions may be associated with different RSs and different TCI states. For example, one or more SSB indexes of the cell are related to one MBS PDSCH transmission. For example, SSB index 1 may be related to MBS PDCCH/PDSCH1, SSB index 2 may be related to MBS PDCCH/PDSCH2, SSB index 3 may be related to MBS PDCCH/PDSCH3, and the like. Alternatively, one or more CSI-RS resources of the cell may be related to one MBS PDSCH transmission.

FIG. 8 illustrates MBS PDSCH retransmission and resource allocation/transmission of UE common PUCCH associated with an SSB index according to an embodiment of the present invention.

The base station provides one or more CORESET and Search Space Set (SSS) through one or more DL BWPs for MBS PDCCH monitoring. One or more TCI states, one or more SSB indexes, one or more CSI-RS resources may be related to one or more CORESETs and/or SSSs.

Receiver (e.g., UE):

RRC connected UE may select a CORESET and a search space set according to its current TCI state, and may receive the DCI by monitoring the PDCCH through the selected SSS. Idle or inactive UE periodically measures the SSB index or CSI-RS resource, selects the CORESET and Search Space Set related to the SSB index or CSI-RS resource exceeding a threshold, and monitors the PDCCH through the selected SSS to receive DCI.

The UE monitors the MBS PDCCH through the DL BWP for the MBS. If there are CORESET and SSS related to a current TCI state or SSB index/CSI-RS resource exceeding the threshold in a plurality of DL BWPs, the idle/inactive UE selects an initial BWP or a DL BWP that overlaps with the initial BWP, and the connected UE selects a currently active BWP or configured BWP or a DLBWP that overlaps with the currently active BWP or configured BWP.

The UE monitors the MBS PDCCH through the selected DL BWP. If there are a plurality of CORESETs and SSSs related to the current TCI state or the SSB index/CSI-RS resource exceeding the threshold, UE may select a CORESET and SSS not overlapped with other transmission/reception operations of the UE, or select the closest CORESET and SSS.

The UE monitors the PDCCH through the selected CORESET and SSS, and receives DCI through the PDCCH. The DCI in which the CRC is scrambled is decoded with the G-RNTI of the MBS service that the UE wants to receive.

The DCI scrambled by the G-RNTI may include at least some of the following information:
Identifier for DCI formats
Frequency domain resource assignment
SS/PBCH index or CSI-RS resource indicator or TCI state Id
Time domain resource assignment
VRB-to-PRB mapping
Modulation and coding scheme
New data indicator
Redundancy version
HARQ process number The UE receives the PDSCH indicated by the DCI. Here, 'SS/PBCH index or CSI-RS resource indicator or TCI state Id' indicates an SS/PBCH index or CSI-RS resource indicator or TCI state Id associated with the indicated PDSCH. The UE receives the PDSCH according to the indicated SS/PBCH index or CSI-RS resource indicator or TCI state Id.

DCI may include at least the following information to allocate PUCCH resources for HARQ feedback.
HARQ feedback enabling indicator—1 bit
 TPC command for scheduled PUCCH—2 bits
 PUCCH resource indicator—3 bits
 PDSCH-to-HARQ feedback timing indicator—3 bits If the HARQ feedback enabling indicator=0, the UE assumes that the DCI does not include the TPC command for scheduled PUCCH, PUCCH resource indicator, and PDSCH-to-HARQ_feedback timing indicator, and does not transmit HARQ feedback for the PDSCH indicated by the DCI.

If HARQ feedback enabling indicator=1, the UE assumes that the TPC command for scheduled PUCCH, PUCCH resource indicator, PDSCH-to-HARQ feedback timing indicator is included in the corresponding DCI, and transmits HARQ feedback for the PDSCH transmission through the PUCCH resource indicated by DCI. In this case, the UE performs PUCCH transmission through the PUCCH resource based on the SS/PBCH index or CSI-RS resource indicator or TCI state Id indicated in the corresponding DCI. UCI included in PUCCH includes HARQ feedback information. HARQ feedback information is determined as ACK or NACK according to the decoding result of the PDSCH transmission indicated by the corresponding DCI.

The base station may transmit beams related to different SS/PBCH indexes and/or CSI-RS resource indicators and/or TCI states for different PDSCHs transmitting the same MBS TB. In this way, different PDSCHs transmitting the same MBS TB may be referred to as an MBS PDSCH set. In FIG. 8, different PDSCHs in one MBS PDSCH set, such as PDSCH1, PDSCH2, and PDSCH3, may be associated with different SS/PBCHs, CSI-RS resources, and/or TCI states.

If DCI is not configured to indicate an SSB index, CSI-RS resource, or TCI state, the base station may configure the SSB index, CSI-RS resource, or TCI state associated with each PUCCH resource through an RRC message. At least one SSB index, or at least one CSI-RS resource, or at least one TCI state may be configured with respect to one PUCCH resource through an RRC message. If a UE is scheduled to perform PUCCH transmission based on a PUCCH resource indicated by DCI, the PUCCH transmission including an HARQ A/N may be performed based on the SSB index, CSI-RS resource, or TCI state associated with the PUCCH resource indicated by DCI.

At least one MBS PUCCH resource set can be configured for each MBS UL common frequency resource MBS UL BWP. One MBS UL common frequency resource/MBS UL BWP may be associated with at least one MBS DL common frequency resource/MBS DL BWP. Or a plurality of MBS UL common frequency resources/MBS UL BWPs may be associated with at least one MBS DL common frequency resource/MBS DL BWP.

MBS NACK Only-Based or ACK/NACK-Based PUCCH Resource Configuration

By DCI or MAC CE or RRC message, the PUCCH resource is configured to support NACK only-based HARQ feedback or ACK/NACK-based HARQ feedback. In the case of NACK-only-based HARQ feedback, HARQ feedback is transmitted only when the TB reception result through the mapped PDSCH is NACK, and in case of ACK, HARQ feedback is not transmitted. That is, in case of ACK, PUCCH transmission is not performed. In the case of PUCCH format 0 and NACK, the HARQ-ACK information bit is set to 1 or 0.

On the other hand, when the PUCCH resource is ACK/NACK-based HARQ feedback, when the TB reception result through the mapped PDSCH is NACK, NACK is reported, and in the case of ACK, ACK is reported.

On the other hand, the MBS PUCCH resource set can be shared by a plurality of UEs receiving the same TB(s), and all PUCCH resources in the PUCCH resource set are configured with either NACK only-based HARQ feedback or ACK/NACK-based HARQ feedback. Alternatively, each PUCCH resource is individually configured as NACK only-based HARQ feedback or ACK/NACK-based HARQ feedback.

When all or some PUCCH resources in the PUCCH resource set are configured as ACK/NACK-based HARQ feedback, these PUCCH resources may be allocated to at least one UE receiving the MBS. At least one of these allocated PUCCH resource is allocated as a UE dedicated MBS PUCCH resource. If the UE-dedicated MBS PUCCH resource is configured, the UE may transmit HARQ A/N for at least one MBS TB through the UE-dedicated MBS PUCCH resource. For example, when a plurality of PUCCH resource IDs in the PUCCH resource set are configured, one PUCCH resource ID is allocated as a UE-dedicated MBS PUCCH resource to each UE. When all UEs receiving a specific MBS TB are in the RRC connected mode, the base station may allocate such MBS PUCCH resource ID to the UE by using a UE-dedicated RRC message, a UE-dedicated MAC CE, or a UE-dedicated DCI. Alternatively, the UE-dedicated MBS PUCCH resource ID may be allocated according to a specific formula. In this case, the specific formula may allow the PUCCH resource ID to be calculated by inputting the UE ID or C-RNTI of the corresponding UE. For example, if there are N PUCCCH resource IDs in the PUCCH resource set, it may be assigned as 'UE-dedicated PUCCH resource ID=UE ID mod N' or 'UE-dedicated PUCCH resource ID=C-RNTI mod N'.

When all or some PUCCH resources in the PUCCH resource set are configured with NACK only based HARQ feedback, these PUCCH resources are allocated to at least one service (e.g., TMGI), and a plurality of UEs receiving the same TB can share these PUCCH resource. Accordingly, at least one of the UEs receiving the same TB may transmit a NACK through the shared PUCCH resources.

Meanwhile, the UE can receive at least one of PDSCH transmissions for the same MBS TB (i.e., one MBS PDSCH set). For example, when measurements for SSB indices 1 and 2 are equal to or greater than the threshold, the UE may receive both PDSCH1 and PDSCH2, or receive either PDSCH1 or PDSCH2. If the PDCCH for PDSCH1 or the PDCCH for PDSCH2 indicates HARQ feedback enabling indicator=1, or when HARQ feedback is enabled for the service of the TB based on RRC/MAC CE signaling, a UE can selects one of the received PDSCHs, and transmits HARQ feedback using a PUCCH resource related to the selected PDSCH resource.

Alternatively, one MBS PDSCH set can be related to one MBS PUCCH resource set, and one MBS PUCCH resource set may include N MBS PUCCH resources. When one MBS PDSCH set includes M PDSCH resources for transmitting the same TB, M PDSCH resources can be related to N PUCCH resources. In this case, one PDSCH resource out of M PDSCH resource can be related to at least one PUCCH resource out of N PUCCH resources. Alternatively, at least one PDSCH resource for the same TB can be related to one PUCCH resource. A plurality of PDSCH resources for the same TB can be related to a plurality of MBS PUCCH resources. The N MBS PUCCH resources may be related to at least one RS (e.g., SSB or CSI-RS) or TCI state. One PUCCH resource may be related to at least one RS or TCI state. Alternatively, a plurality of PUCCH resources may be related to at least one RS or TCI state.

MBS HARQ A/N Transmission Scheme

If the base station enables HARQ feedback for a specific MBS service or an MBS PDSCH set for a specific TB through DCI, MAC CE, or RRC message, the UE that has received the specific PDSCH among the MBS PDSCH set may transmit Uplink HARQ A/N information at least one of the following methods.

1) Method 1-1: UCI including HARQ A/N information is transmitted on one PUCCH resource related to specific PDSCH transmission. In this case, the HARQ A/N information indicates whether decoding of one TB of specific PDSCH is successful. For example, HARQ A/N for the TB is transmitted in at least one of the following examples.

A. If the measurement result for the RS or TCI state related to the PUCCH resource is greater than or equal to the threshold, HARQ A/N for the TB is transmitted only through the PUCCH resource.

B. If the measurement result for the RS or TCI state related to the PUCCH resource is less than or equal to a threshold, or the PUCCH resource overlaps with other uplink/downlink transmission/reception (higher priority than the PUCCH transmission), or when uplink transmission through the PUCCH resource is not possible due to transmission power limitation at UE, or when the interval between a specific PDSCH time point received by the UE and the PUCCH resource is less than a predetermined time interval, or when the UE has limited capability regarding uplink transmission through the PUCCH resource, or when HARQ feedback through the PUCCH resource is disabled, HARQ A/N for the TB is transmitted through another MBS PUCCH resource available for transmitting HARQ A/N for the TB. At this time, the measurement result for the RS or TCI state related to another MBS PUCCH resource may be above the threshold. In addition, another MBS PUCCH resource may be included in the PUCCH resource set related to the MBS PDSCH set to which the PDSCH transmission belongs.

C. If the measurement result for the RS or TCI state related to the PUCCH resource is less than or equal to a threshold, or the PUCCH resource overlaps with other uplink/downlink transmission/reception (with higher priority than the PUCCH transmission), or when uplink transmission through the PUCCH resource is not possible due to the UE's limited transmission power, or when the interval between a specific PDSCH time point received by the UE and the PUCCH resource is less than a predetermined time interval, or when the UE has limited capability such that uplink transmission through the PUCCH resource cannot be performed, or when HARQ feedback through the PUCCH resource is disabled, HARQ A/N for the MBS TB can be transmitted based on another unicast PUCCH resource or PUSCH resource available for transmitting HARQ A/N for the TB. For example, when the UE is receiving unicast PDSCH and MBS PDSCH, the UE can multiplex HARQ A/N information for unicast TB of unicast PDSCH and HARQ A/N information for MBS TB in a unicast PUCCH resource for unicast PDSCH. If the HARQ A/N information in the MBS TB is NACK only-based HARQ feedback, it can be converted into ACK/NACK-based HARQ feedback (i.e., configured as HARQ A/N information for the MBS TB). Meanwhile, the UE separately encodes the HARQ A/N information C1 bit for unicast TB and the HARQ A/N information C2 bit for MBS TB, and combines the separate encoding results to configure UCI. Alternatively, the HARQ A/N information C1 bit for unicast TB and the HARQ A/N information C2 bit for MBS TB are combined to perform joint encoding, and the encoding result is configured as UCI. The UE transmits the configured UCI through unicast PUCCH or PUSCH. If there is no space for UCI to include HARQ A/N for MBS TB as unicast feedback such as unicast HARQ A/N or SR/CSI reporting, the UE determines that MBS TB has a high priority among unicast feedbacks. HARQ A/N for MBS TB and information with high-priority can be encoded separately, and UCI can be configured by combining the separate encoding results.

2) Method 1-2: The same HARQ A/N information is repeatedly uplink transmitted using a plurality of PUCCH resources related to specific PDSCH. Alternatively, the same HARQ A/N information is repeatedly transmitted for at least one slot using a plurality of PUCCH resources of a PUCCH resource set related to an MBS PDSCH set for a specific PDSCH. The HARQ A/N information indicates whether decoding of one TB to be obtained by the UE through specific PDSCH is successful. The UE may repeatedly transmit HARQ A/N for the TB by selecting all or some of N PUCCH resources. For example, HARQ A/N for the TB is transmitted in at least one of the following ways.

A. If the plurality of PUCCH resources are all related to the same RS or TCI state, the UE repeatedly transmits HARQ A/N for the TB through all the PUCCH resources.

B. The UE can transmit HARQ A/N for the TB once or repeatedly through at least one PUCCH resource that can be transmitted first among all the PUCCH resources.

C. The UE can select all or some PUCCH resources that can be transmitted according to UE capability among all the PUCCH resources, and transmits HARQ A/N for the TB once or repeatedly with the selected PUCCH resource.

D. If the plurality of PUCCH resources are related to different RSs or TCI states, the UE can transmit the HARQ A/N for the TB once or repeatedly only through the PUCCH resources for RS(s) or TCI state(s) above a threshold. The UE can transmit HARQ A/N for the TB once or repeatedly through at least one PUCCH resource that can be transmitted first among PUCCH resources above the threshold.

E. If a plurality of PUCCH resources are related to the same or different RSs or TCI states, and the measurement result in any RS or TCI state is not above or below the threshold, or if the quality of the cell for MBS transmission is below the threshold, HARQ A/N for the TB is repeatedly transmitted through some or all PUCCH resources not overlapping with other transmission/reception.

F. The UE may transmit the HARQ A/N for the TB once or repeatedly through PUCCH resources not overlapping with other uplink/downlink transmission/reception (with higher priority than the PUCCH transmission) among the plurality of PUCCH resources.

G. HARQ A/N for the TB can be transmitted once or repeatedly through PUCCH resources generated after a predetermined time interval from a specific PDSCH transmission time received by the UE among the plurality of PUCCH resources.

3) Method 1-3: HARQ A/N information is transmitted through one PUCCH resource related to a plurality of PDSCHs for transmitting L TBs belonging to different PDSCH sets. (L>0) In this case, the HARQ A/N information indicates whether decoding is successful for L TBs obtained by the UE through specific PDSCH transmission. If the PUCCH provides C UCI bits (C>0), the UE can transmit HARQ A/N information for each of the L TBs in the allocated UCI bits. For example, HARQ A/N for the TB is transmitted in at least one of the following ways.

A. If the PUCCH resource is NACK only-based HARQ feedback, if any one of the L TBs is NACK, the PUCCH is transmitted to report NACK, and if all L TBs are ACK, the PUCCH for reporting ACK is not transmitted.

B. If the PUCCH resource is ACK/NACK-based HARQ feedback and C=1, if all L TBs are ACK, HARQ A/N information indicating ACK is transmitted. If any one of the L TBs is NACK, HARQ A/N information indicating NACK is transmitted.

C. If the PUCCH resource is ACK/NACK-based HARQ feedback and L>C>1, L TBs are classified as C groups, and if all TBs in a group are ACK, the UCI bit for the group is configured to indicate ACK, and if at least one TB in a group is NACK, the UCI bit for the corresponding group is configured to indicate NACK.

D. When the PUCCH resource is ACK/NACK-based HARQ feedback and C=L, a UCI bit is allocated to each of L TBs, and if a TB is ACK, the UCI bit for the corresponding TB is set to indicate ACK. If a TB is NACK, the UCI bit for the corresponding TB is set to indicate NACK.

4) Method 1-4: HARQ A/N information for NACK-only-based HARQ feedback is transmitted on N PUCCH resources related to a plurality of PDSCHs for L TBs belonging to different PDSCH sets (L>0, N>0). In this case, the HARQ A/N information indicates whether decoding of L TBs in a specific PDSCH transmission is successful at the UE. For example, HARQ for the TB can be transmitted in at least one of the following methods:

A. If PUCCH resources indicated by each DCI for each PDSCH is different for the plurality of PDSCHs, or if M PUCCH resources related to the plurality of PDSCH transmissions are configured by MAC CE or RRC, the UE may select all or some of the PUCCH resources. If the measurement result for the RS or TCI state related to the PUCCH resource is less than or equal to a threshold, or the PUCCH resource overlaps with other uplink/downlink transmission/reception (having higher priority than the PUCCH transmission), or when uplink transmission cannot be performed through the PUCCH resource due to limited transmission power of the UE, or when HARQ feedback through the PUCCH resource is disabled, the UE may select remaining N PUCCH resources while excluding PUCCH resource(s) corresponding to above conditions from the M PUCCH resources and performs the following operations based on the N PUCCH resources.

B. If the PUCCH resource is NACK only-based HARQ feedback and N=1, if all L TBs are ACK, HARQ A/N information indicating ACK is transmitted, and if any one of the L TBs is NACK, HARQ A/N information indicating NACK is transmitted.

C. If the PUCCH resource is NACK only-based HARQ feedback and L>N>1, L TBs are divided into N groups, different groups are related to different PUCCH resources. If all TBs in a group are ACK, a PUCCH resource for the corresponding group is not transmitted. If at least one TB in a group is NACK, a PUCCH resource for the corresponding group is transmitted.

D. If the PUCCH resource is NACK-only-based HARQ feedback and N=L, different PUCCH resources are allocated to each of the L TBs, and if a TB is ACK, a PUCCH resource for the corresponding TB is not transmitted. If a TB is NACK, the PUCCH resource for the TB is transmitted.

On the other hand, when multiplexing a plurality of MBS PUCCH/UCI into one UCI based on the above proposed method, or when multiplexing PUCCH/UCI and MBS PUCCH/UCI for unicast transmission, the base station and the UE may determine Priority for information as follows. And, the UE may drop a low-priority information and include a high-priority information in the UCI. Here, the last information (with the smallest value) may have the lowest priority.

Priority method 1: NR Rel.15/16 HARQ A/N>Unicast MBS HARQ A/N>Multicast MBS HARQ A/N>NACK only>SR>unicast CSI>multicast CSI Priority method 2: NR Rel.15/16 HARQ A/N>Unicast MBS HARQ A/N>SR>Multicast MBS HARQ A/N>NACK only>unicast CSI>multicast CSI Priority method 3: NR Rel.15/16 HARQ A/N>Unicast MBS HARQ A/N>Multicast MBS HARQ A/N>SR>NACK only>unicast CSI>multicast CSI Priority method 4: UE configures the priority according to the RRC message configuration from the base station.

For example, the UE may configure with one of the above methods according to the instruction of the base station.

Priority method 5: When the DCI transmitted by the base station allocates MBS PUCCH or MBS PUSCH resources, DCI may be configured to indicate a priority (in comparison of unicast). For example, the UE may be configured with one of the above methods according to the priority indicated by DCI.

Meanwhile, after receiving a specific PDSCH, the UE may transmit a corresponding PUCCH according to the RS or TCI state related to the PUCCH resource for the specific PDSCH. If a plurality of PUCCH resources are related to the specific PDSCH, the PUCCH transmission is performed based on each of the RS or TCI state(s) related to each of the PUCCH resources. Alternatively, the PUCCH is repeatedly transmitted according to the same RS or TCI state to which all PUCCH resources are related. Alternatively, the corresponding PUCCH is transmitted according to RS or TCI state(s) related to the specific PDSCH transmission.

The PUCCH resource transmitted by the UE can be related to a specific PUCCH resource ID. The base station may retransmit the PDSCH according to the HARQ A/N information of the PUCCH received from the UE. In this case, the PDSCH resource for retransmission is selected from the MBS PDSCH set of the previous PDSCH transmission for the TB. If the HARQ retransmission of the TB is received by the PDSCH resource in the MBS PDSCH set, the UE transmits HARQ A/N information (for the HARQ retransmission of the TB) on the PUCCH resource related to the specific PUCCH resource ID. Alternatively, the UE may transmit HARQ A/N information (for HARQ retransmission of the TB) on a PUCCH resource related to a PUCCH resource ID different from the specific PUCCH resource ID. That is, the UE may transmit based on different PUCCH resource IDs for the N th PDSCH transmission and the N+1 th PDSCH transmission of the same TB. In this case, different PUCCH resource IDs may be related to different RS or TCI state(s), and the UE may transmit PUCCH using the changed RS or TCI state for HARQ retransmission. For example, the base station may alternately receive PUCCH A/N for the same TB through different TRPs. That is, the HARQ A/N of the N-th transmission may be received in TRP1, and the HARQ A/N of the N+1-th transmission may be received in TRP2.

PUCCH Resource Allocation Based on DCI

When a PUCCH resource is allocated through DCI, the DCI may include the following information.

S1: staring symbol of PUCCH repetitions or corresponding PUCCH based on PUCCH-configuration L1: starting symbol of PUCCH duration based on PUCCH-configuration K1: PDSCH to HARQ feedback timing in slot N1: min processing time determined by UE capability NACK only based HARQ feedback or ACK/NACK based HARQ feedback : may indicates whether the PUCCH resource is NACK only-based HARQ feedback or ACK/NACK-based HARQ feedback.

: Or, other field DCI such as K1 may implicitly indicate NACK-only-based HARQ feedback PUCCH resource indicator PUCCH resource repetition number : When a plurality of PUCCH resources are allocated, the number of PUCCH resources repeated from the first PUCCH resource indicated by the PUCCH resource indicator PUCCH resource repetition gap
: When a plurality of PUCCH resources are allocated, a time interval between PUCCH resources repeated from the first PUCCH resource indicated by the PUCCH resource indicator If a plurality of DCIs for a plurality of PDSCHs transmitting the same or different TBs all allocate the same PUCCH resource, the base station configure all DCIs to indicate the same PUCCH resource, or only (some) special DCI (e.g., the last DCI) can indicate a PUCCH resource. The special DCI can be transmitted based on a specific RNTI, a specific Search Space and/or a specific CORESET.

If a UE does not receive all the PDSCHs, PUCCH resources may be allocated by additionally monitoring the transmission of the special DCI, and HARQ A/N may be transmitted using the PUCCH resources allocated by the special DCI. In this case, the HARQ A/N information may indicate ACK or NACK for a plurality of TBs. Therefore, the UE transmits HARQ A/N information including ACKs or NACKs for all TBs to the base station even if it does not receive all TBs (e.g., only receives some TBs). The UE can determine the number of all TBs through DCI. Accordingly, the UE reports ACK or NACK according to the decoding state for the TB received in the UE, and reports ACK for the TB not actually received. For example, when transmitting 3 bit HARQ A/N for 3 TBs, 2 bits for 2 TBs that are actually received are set according to the actual decoding result, and 1 bit for the remaining TB not received is set to ACK.

Meanwhile, the UE can transmit the PUCCH only when a certain time is guaranteed after the last symbol of the received PDSCH. To this end, the base station configures the interval between the last symbol of transmission for a specific RS/TCI state and PUCCH resources for the same specific RS/TCI stat to ensure processing time according to UE capability. Alternatively, the interval between the last symbol of the last PDSCH of the PDSCH set that transmits the Nth HARQ for the same TB and the corresponding PUCCH resource is configured to ensure processing time according to UE capability. If the processing time is not guaranteed, the UE may determine that a PUCCH resource cannot be selected. Meanwhile, when the TB is transmitted only to connected mode UEs, the base station may configure the interval according to the longest processing time among the connected UEs. If the TB is transmitted to idle/inactive UEs, the base station may configure the interval according to the longest processing time in the standard.

As shown above, in an embodiment of the present invention, an MBS HARQ feedback/configuration method is proposed for the UE reporting HARQ feedback for MBS PDSCH (re)transmission.

Meanwhile, the MBS BWP can be referred to as "common frequency resource (CFR)", and CFR may be configured as DL only. In this case, the HARQ-ACK (or NACK only) can be transmitted through (unicast) active UL BWP. HARQ feedback, may correspond to either A/N report or NACK only report according to configuration through higher layer. For example, when NACK only scheme is configured, HARQ feedback is transmitted only when the UE fails to receive a corresponding MBS, else if the UE correctly receive the MBS, ACK transmission is omitted. On the other hand, A/N report scheme is configured, the UE report HARQ-ACK response for both cases of ACK or NACK.

Figure 9:
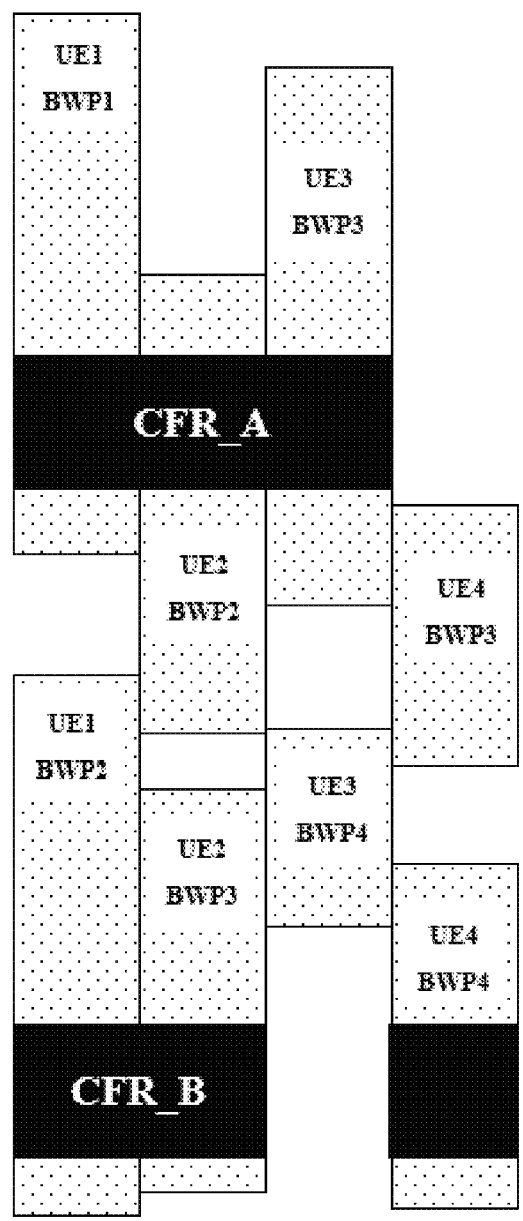

The CFR for MBS may provide the same MBS for one or more UEs. FIG. 9 illustrates an example of CFR and BWP association. Referring to FIG. 9 the CFR_A is associated with (configured within) the UE1's BWP1, and the CFR_B is associated with (configured within) the UE1's BWP2. Also The CFR_A can be configured for UE2's BWP2 and UE3's BWP3, and CFR_B can be configured for UE2's BWP3 and UE34s BWP4. Thus, CFR_A is a common frequency resource for UEs 1, 2, and 3, and CFR_B is a common frequency resource for UEs 1, 2, and 4.

For example, let's assume that UE1's current active BWP is BWP1 and UE1 is receiving MBS in CFR_A associated with the UE1's BWP1. In this case, if the UE1 is indicated to switch to the BWP2 through DCI, then the UE1 activates BWP2 (which was in deactivated state) and starts to receive MBS through CFR_B associated with the new active BWP. Upon the completion of the BWP switching, BWP1 can be deactivated. And, the UE1 no more receives CFR_A.

Figure 10:
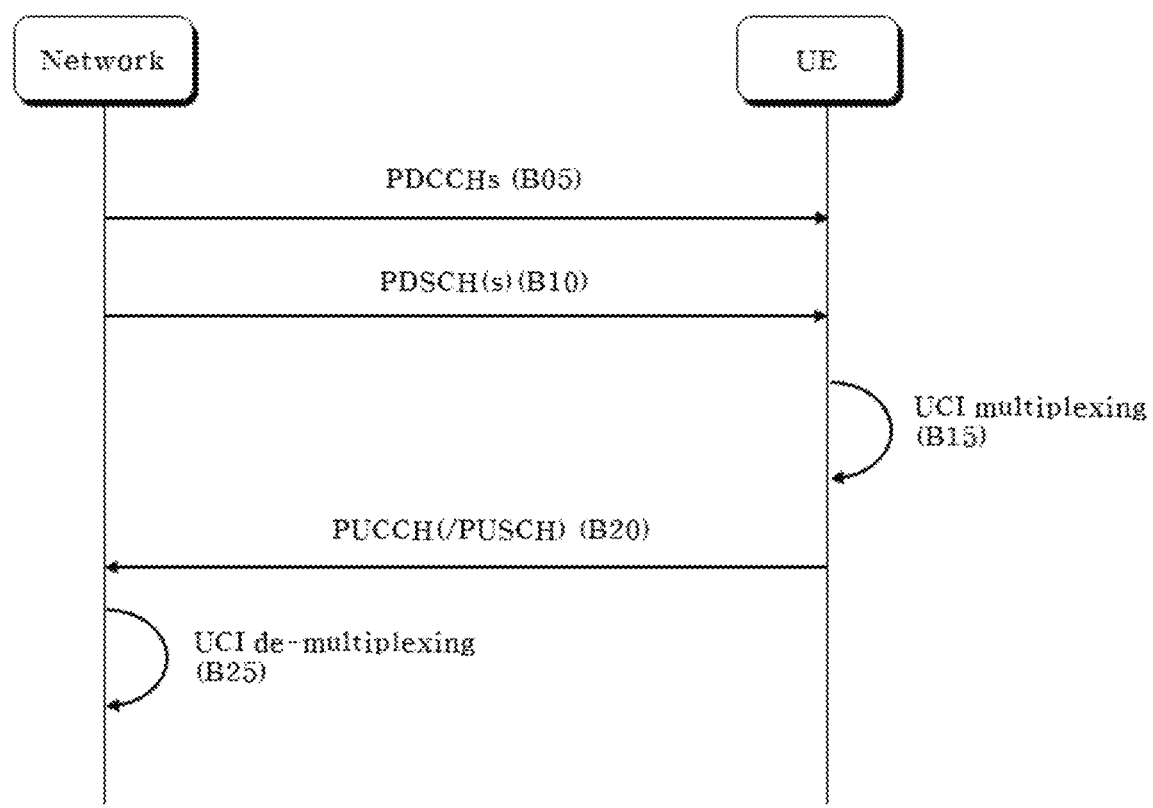
FIG. 10 illustrates CFR and BWP association according to an embodiment of the present invention.

FIG. 10 illustrates a method of receiving a signal by a user equipment in an embodiment of the present invention.

As mentioned above, existing NR system (such as Rel. 15/16) does not allow HARQ feedback for the multicast service. According to an embodiment of the present invention, UCI multiplexing scheme and priority therefore is provided, particularly for a case where the HARQ feedback for the multicast service should be multiplexed with unicast HARQ feedback, and/or SR, CSI report etc.

Referring to FIG. 10, the UE may receive (B05) a plurality of physical downlink control channels (PDCCHs) each carrying downlink control information (DCI). For example, the plurality of PDCCHs may include a first PDCCH carrying first DCI for unicast scheduling and a second PDCCH carrying second DCI for multicast scheduling.

The UE may receive (B10) one or more downlink (DL) signals based on the PDCCHs. For example, the one or more DL signals may include a unicast physical downlink shared channel (PDSCH) scheduled by the first DCI, and a multicast PDSCH scheduled by the second DCI.

The UE may transmit (B20) a single physical uplink control channel (PUCCH), based on uplink control information (UCI) including hybrid automatic repeat request (HARQ) feedback information for the one or more DL signals. For example, the HARQ feedback information may include at least one of first HARQ feedback information for the unicast PDSCH, and second HARQ feedback information for the multicast PDSCH.

Preferably, in a state where the UCI for the single PUCCH includes two or more of the HARQ feedback information, a scheduling request (SR), and a channel state information (CSI) report, and a size of the UCI exceeds a maximum payload size of the single PUCCH, the UE may perform UCI multiplexing (B15) for the signal PUCCH based on a priority of the HARQ feedback information, a priority of the SR and a priority of the CSI report. The priority of the HARQ feedback information may be higher than the priority of the SR, and within the HARQ feedback information, the first HARQ feedback information may be prioritized over the second HARQ feedback information.

Preferably, the SR is related to a unicast SR, and the second HARQ feedback information for the multicast PDSCH is prioritized over the unicast SR. For example, considering the retransmission overhead caused from dropping the HARQ-feedback, ongoing HARQ-process (HARQ feedback for unicast/multicast PDSCH) should be prioritized over the new HARQ process (scheduling request).

Preferably, the CSI report is allocated with a lowest priority. Preferably, within the CSI report, a first CSI report related to the unicast PDSCH is prioritized over the second CSI report related to the multicast PDSCH.

Preferably, the UE performs dropping from a lowest priority such that the multiplexed UCI does not exceed the maximum payload size of the single PUCCH.

Preferably, in a state where the UCI for the single PUCCH includes the two or more of the HARQ feedback information, the SR, and the CSI report, but the size of the UCI does not exceed the maximum payload size of the single PUCCH, the UE performs UCI multiplexing without dropping.

Preferably, wherein the first HARQ feedback information for the unicast PDSCH is always configured based on an acknowledgment (ACK)/Negative-ACK (HACK)-based scheme, and the second HARQ feedback information for the multicast PDSCH, is configured based on either the ACK/NACK-based scheme or a NACK only-based scheme.

Preferably, the UE may receive HARQ feedback configuration for the multicast PDSCH including information indicating either the ACK/NACK-based scheme or the NACK only-based scheme.

Figure 11:
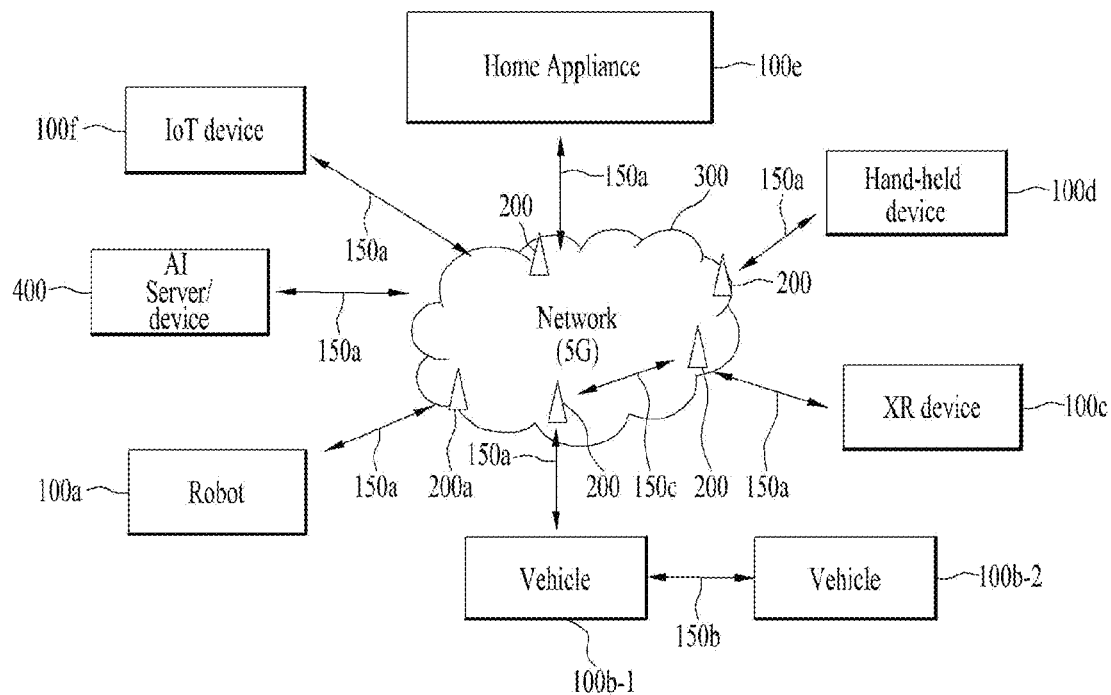
FIG. 11 illustrates a method of receiving a signal by a user equipment in an embodiment of the present invention.

FIG. 11 illustrates a communication system 1 applied to the present disclosure.

Referring to FIG. 11, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 12:
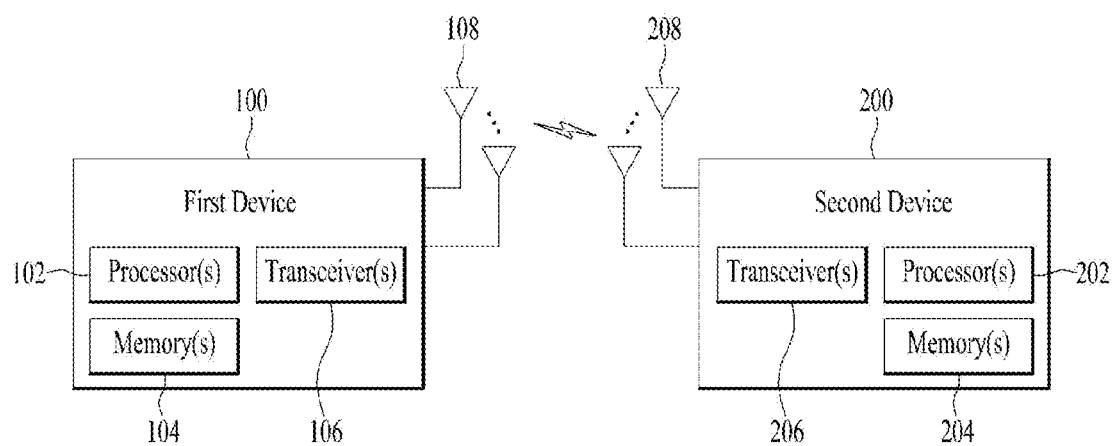

FIG. 12 illustrates wireless devices applicable to the present disclosure.

Referring to FIG. 12, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 11.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 13:
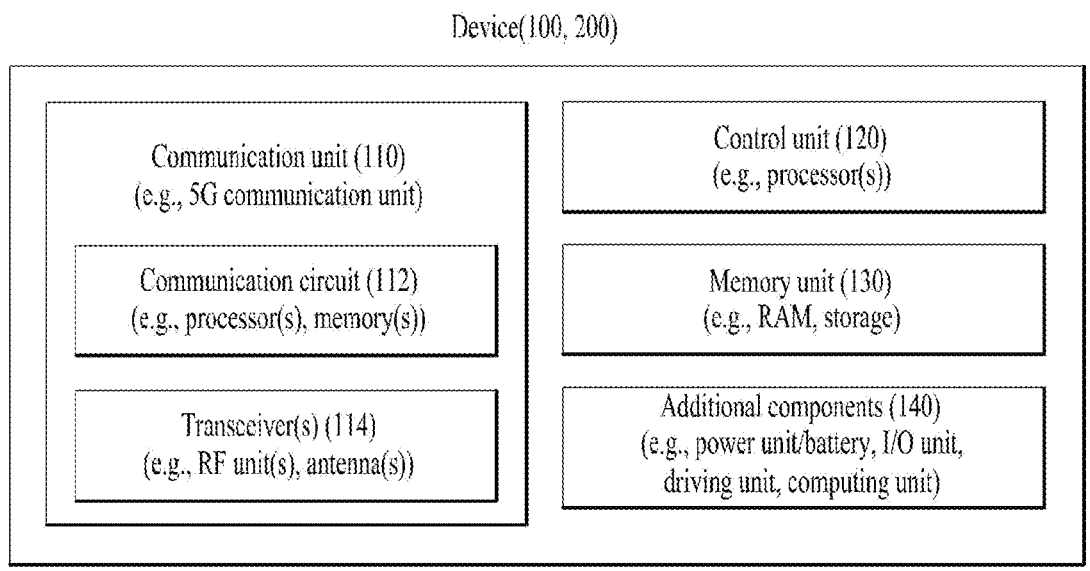

FIG. 13 illustrates another example of a wireless device applied to the present disclosure. The wireless device may be implemented in various forms according to a use-case/service (refer to FIG. 13).

Referring to FIG. 13, wireless devices 100 and 200 may correspond to the wireless devices 100 and 200 of FIG. 12 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 11), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcast terminal, a hologram device, a public safety device, an MTC device, a medicine device, a fintech device (or a finance device), a security device, a climate/environment device, the AI server/device (400 of FIG. 11), the BSs (200 of FIG. 11), a network node, etc. The wireless device may be used in a mobile or fixed place according to a use—example/service.

In FIG. 13, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 14:
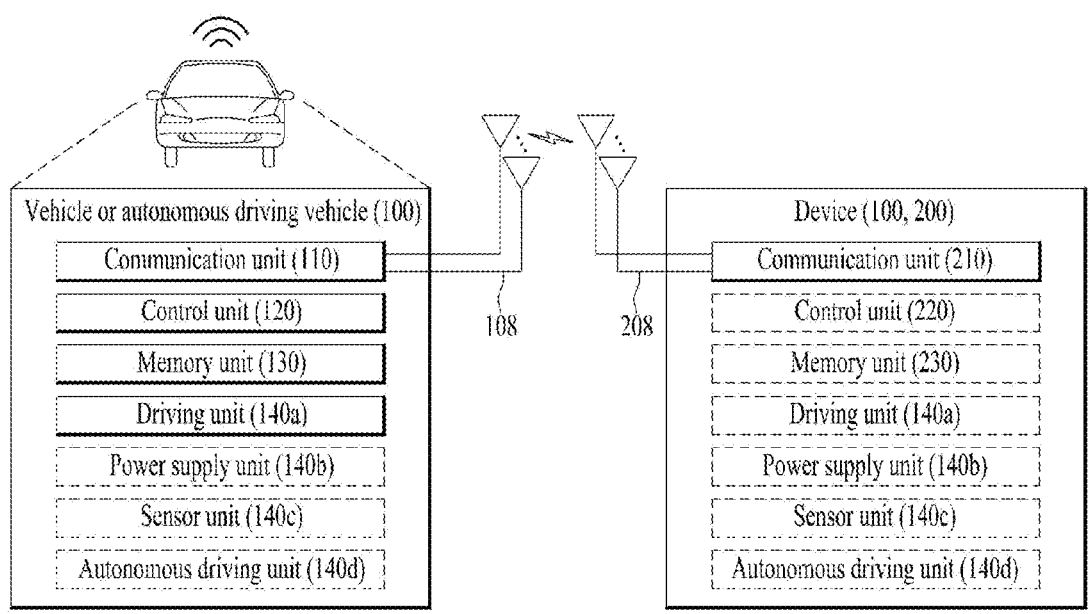

FIG. 14 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 14, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 13, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 15:
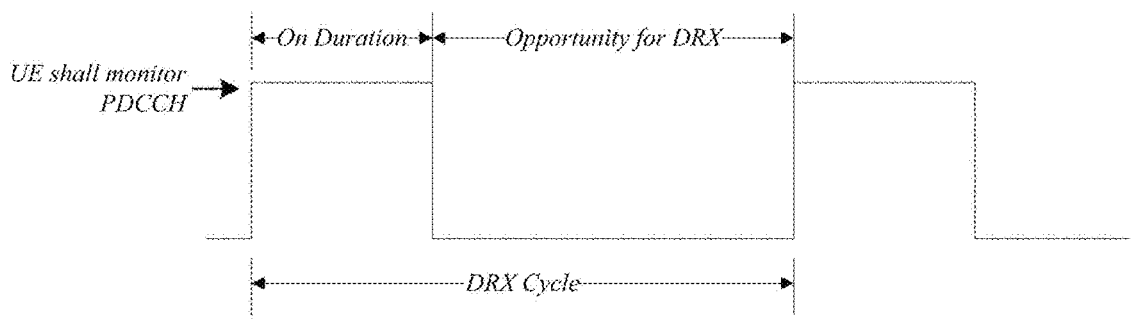
FIG. 15 illustrates an exemplary discontinuous reception (DRX) operation applied to the present disclosure.

FIG. 15 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 15, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 8 describes a DRX operation of a UE (in the RRC_CONNECTED state). Referring to Table 8, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 8

| | Type of signals | UE procedure |
| --- | --- | --- |
| 1$^{st}$ step | RRC signalling(MAC-CellGroupConfig) | Receive DRX configuration information |
| 2$^{nd}$ Step | MAC CE((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of receiving a signal by a user equipment (UE) in a wireless communication system, the method comprising:

receiving a plurality of physical downlink control channels (PDCCHs) each carrying downlink control information (DCI), wherein the plurality of PDCCHs includes a first PDCCH carrying first DCI for unicast scheduling and a second PDCCH carrying second DCI for multicast scheduling;

receiving one or more downlink (DL) signals based on the PDCCHs, wherein the one or more DL signals includes a unicast physical downlink shared channel (PDSCH) scheduled by the first DCI, and a multicast PDSCH scheduled by the second DCI; and transmitting a single physical uplink control channel (PUCCH), based on uplink control information (UCI) including hybrid automatic repeat request (HARQ) feedback information for the one or more DL signals, wherein the HARQ feedback information includes at least one of first HARQ feedback information for the unicast PDSCH, and second HARQ feedback information for the multicast PDSCH, wherein one of an acknowledgment (ACK)/Negative-ACK (NACK)-based scheme and a NACK only-based scheme is configured for the second HARQ feedback information, through higher layer signaling, wherein in a state where the NACK only-based scheme is configured for the second HARQ feedback and the UCI for the single PUCCH includes both of first HARQ feedback information for the unicast PDSCH and second HARQ feedback information for the multicast PDSCH, both of the first HARQ feedback information for the unicast PDSCH and the second HARQ feedback information for the multicast PDSCH are generated based on the ACK/NACK-based scheme for multiplexing of the first HARQ feedback information and the second HARQ feedback information within the single PUCCH.

2. The method of claim 1, wherein the UCI further includes at least one of a scheduling request (SR), and a channel state information (CSI) report, wherein in a case where a size of the UCI exceeds a maximum payload size of the single PUCCH, the UE performs UCI multiplexing for the signal PUCCH based on a priority of the HARQ feedback information, a priority of the SR and a priority of the CSI report,
wherein the priority of the HARQ feedback information is higher than the priority of the SR,
wherein, within the HARQ feedback information, the first HARQ feedback information is prioritized over the second HARQ feedback information, and
wherein the SR is related to a unicast SR, and the second HARQ feedback information for the multicast PDSCH is prioritized over the unicast SR.

3. The method of claim 2, wherein the CSI report is allocated with a lowest priority.

4. The method of claim 3, wherein, within the CSI report, a first CSI report related to the unicast PDSCH is prioritized over a second CSI report related to the multicast PDSCH.

5. The method of claim 2, wherein the UE performs dropping from a lowest priority such that the multiplexed UCI does not exceed the maximum payload size of the single PUCCH.

6. The method of claim 2, wherein in a state where the UCI for the single PUCCH includes the two or more of the HARQ feedback information, the SR, and the CSI report, but the size of the UCI does not exceed the maximum payload size of the single PUCCH, the UE performs UCI multiplexing without dropping.

7. The method of claim 1, wherein the first HARQ feedback information for the unicast PDSCH is always configured based on the ACK/NACK-based scheme.

8. The method of claim 7, further comprising:
receiving, through the higher layer signaling, HARQ feedback configuration for the multicast PDSCH including information indicating either the ACK/NACK-based scheme or the NACK only-based scheme.

9. A non-transitory computer readable medium storing program codes for performing the method of claim 1.

10. A device for wireless communication, the device comprising:
a memory configured to store instructions; and
a processor configured to perform operations by executing the instructions, the operations comprising:
receiving a plurality of physical downlink control channels (PDCCHs) each carrying downlink control information (DCI), wherein the plurality of PDCCHs includes a first PDCCH carrying first DCI for unicast scheduling and a second PDCCH carrying second DCI for multicast scheduling;
receiving one or more downlink (DL) signals based on the PDCCHs, wherein the one or more DL signals includes a unicast physical downlink shared channel (PDSCH) scheduled by the first DCI, and a multicast PDSCH scheduled by the second DCI; and
transmitting a single physical uplink control channel (PUCCH), based on uplink control information (UCI) including hybrid automatic repeat request (HARQ) feedback information for the one or more DL signals,
wherein the HARQ feedback information includes at least one of first HARQ feedback information for the unicast PDSCH, and second HARQ feedback information for the multicast PDSCH,
wherein one of an acknowledgment (ACK)/Negative-ACK (NACK)-based scheme and a NACK only-based scheme is configured for the second HARQ feedback information, through higher layer signaling,
wherein in a state where the NACK only-based scheme is configured for the second HARQ feedback and the UCI for the single PUCCH includes both of first HARQ feedback information for the unicast PDSCH and second HARQ feedback information for the multicast PDSCH, both of the first HARQ feedback information for the unicast PDSCH and the second HARQ feedback information for the multicast PDSCH are generated based on the ACK/NACK-based scheme for multiplexing of the first HARQ feedback information and the second HARQ feedback information within the single PUCCH.

11. The device of claim 10, further comprising:
a transceiver configured to transmit or receive a signal under control of the processor.

12. The device of claim 10, wherein the device is a user equipment (UE) in a 3rd generation partnership project (3GPP)-based wireless communication system.

13. The device of claim 10, wherein the device configured to control a user equipment (UE) in a 3rd generation partnership project (3GPP)-based wireless communication system.

14. A method of transmitting a signal by a base station (BS) in a wireless communication system, the method comprising:
transmitting a plurality of physical downlink control channels (PDCCHs) each carrying downlink control information (DCI), wherein the plurality of PDCCHs includes a first PDCCH carrying first DCI for unicast scheduling and a second PDCCH carrying second DCI for multicast scheduling;
transmitting one or more downlink (DL) signals based on the PDCCHs, wherein the one or more DL signals includes a unicast physical downlink shared channel (PDSCH) scheduled by the first DCI, and a multicast PDSCH scheduled by the second DCI; and
receiving a single physical uplink control channel (PUCCH), based on uplink control information (UCI) including hybrid automatic repeat request (HARQ) feedback information for the one or more DL signals,
wherein the HARQ feedback information includes at least one of first HARQ feedback information for the unicast PDSCH, and second HARQ feedback information for the multicast PDSCH,
wherein one of an acknowledgment (ACK)/Negative-ACK (NACK)-based scheme and a NACK only-based scheme is configured for the second HARQ feedback information, through higher layer signaling,
wherein in a state where the NACK only-based scheme is configured for the second HARQ feedback and the UCI for the single PUCCH includes both of first HARQ feedback information for the unicast PDSCH and second HARQ feedback information for the multicast PDSCH, both of the first HARQ feedback information for the unicast PDSCH and the second HARQ feedback information for the multicast PDSCH are obtained based on the ACK/NACK-based scheme for de-multiplexing of the first HARQ feedback information and the second HARQ feedback information from the single PUCCH.

15. A device for wireless communication, the device comprising:
a memory configured to store instructions; and
a processor configured to perform operations by executing the instructions, the operations comprising:
transmitting a plurality of physical downlink control channels (PDCCHs) each carrying downlink control information (DCI), wherein the plurality of PDCCHs includes a first PDCCH carrying first DCI for unicast scheduling and a second PDCCH carrying second DCI for multicast scheduling;

transmitting one or more downlink (DL) signals based on the PDCCHs, wherein the one or more DL signals includes a unicast physical downlink shared channel (PDSCH) scheduled by the first DCI, and a multicast PDSCH scheduled by the second DCI; and receiving a single physical uplink control channel (PUCCH), based on uplink control information (UCI) including hybrid automatic repeat request (HARQ) feedback information for the one or more DL signals, wherein the HARQ feedback information includes at least one of first HARQ feedback information for the unicast PDSCH, and second HARQ feedback information for the multicast PDSCH, wherein one of an acknowledgment (ACK)/Negative-ACK (NACK)-based scheme and a NACK only-based scheme is configured for the second HARQ feedback information, through higher layer signaling, wherein in a state where the NACK only-based scheme is configured for the second HARQ feedback and the UCI for the single PUCCH includes both of first HARQ feedback information for the unicast PDSCH and second HARQ feedback information for the multicast PDSCH, both of the first HARQ feedback information for the unicast PDSCH and the second HARQ feedback information for the multicast PDSCH are obtained based on the ACK/NACK-based scheme for de-multiplexing of the first HARQ feedback information and the second HARQ feedback information from the single PUCCH.

* * * * *